(12) United States Patent
Kawaike et al.

(10) Patent No.: US 7,263,217 B2
(45) Date of Patent: Aug. 28, 2007

(54) THREE-DIMENSIONAL MONITORING APPARATUS

(75) Inventors: Noboru Kawaike, Kyoto (JP); Ryuichiro Takaichi, Kyoto (JP); Yorihisa Ikenaga, Kyoto (JP); Toyoo Iida, Kyoto (JP)

(73) Assignee: Omron Corporation, Kyoto-shi (JP)

( * ) Notice: Subject to any disclaimer, the term of this patent is extended or adjusted under 35 U.S.C. 154(b) by 693 days.

(21) Appl. No.: 10/384,776

(22) Filed: Mar. 11, 2003

(65) Prior Publication Data

US 2003/0235331 A1    Dec. 25, 2003

(30) Foreign Application Priority Data

Mar. 13, 2002    (JP)    ............... 2002-069361

(51) Int. Cl.
  *G06K 9/00*    (2006.01)
(52) U.S. Cl. ..................... 382/154; 382/291
(58) Field of Classification Search ............... 382/154, 382/291; 348/42; 356/12
  See application file for complete search history.

(56) References Cited

U.S. PATENT DOCUMENTS

| | | | | |
|---|---|---|---|---|
| 5,737,083 A | * | 4/1998 | Owechko et al. | 356/623 |
| 6,285,778 B1 | * | 9/2001 | Nakajima et al. | 382/104 |
| 6,480,616 B1 | * | 11/2002 | Hata et al. | 382/106 |
| 6,600,509 B1 | * | 7/2003 | Radford et al. | 348/143 |
| 6,674,893 B1 | * | 1/2004 | Abe et al. | 382/154 |
| 6,788,210 B1 | * | 9/2004 | Huang et al. | 340/612 |
| 6,841,780 B2 | * | 1/2005 | Cofer et al. | 250/341.1 |
| 2002/0044682 A1 | * | 4/2002 | Weil et al. | 382/154 |

FOREIGN PATENT DOCUMENTS

| | | |
|---|---|---|
| DE | 44 38 643 C2 | 12/1996 |
| DE | 195 23 843 C1 | 1/1997 |
| DE | 196 04 977 A1 | 8/1997 |
| DE | 19809210 A1 * | 9/1999 |
| DE | 102 02 305 A1 | 8/2002 |
| JP | 01-153903 | 6/1989 |
| JP | 02-268207 | 11/1990 |
| JP | 05-334572 | 12/1993 |

(Continued)

OTHER PUBLICATIONS

Maki et al.; "New Options in Using Infrared for Detection, Assessment, and Surveillance", IEEE, 1996.*

*Primary Examiner*—Bhavesh M Mehta
*Assistant Examiner*—John B Strege
(74) *Attorney, Agent, or Firm*—Foley & Lardner LLP

(57) ABSTRACT

To provide a three-dimensional monitoring apparatus capable of detecting with high accuracy an incoming of an object into a predetermined three-dimensional space by using pattern light as a detecting carrier. A three-dimensional monitoring apparatus comprising (1) an irradiating device for irradiating predetermined pattern light to three-dimensional space S to be monitored, (2) an imaging device for imaging a projection pattern projected by irradiating of the pattern light on an incoming object M and on a screen 5 in the space S to capture image data and (3) a measuring device to measure a position of the object M based on the comparison between a monitoring image captured by the imaging device when there is the object M in the space S and a reference image captured by the imaging device when there is no object M in the space S.

6 Claims, 33 Drawing Sheets

FOREIGN PATENT DOCUMENTS

| | | |
|---|---|---|
| JP | 06-081182 | 11/1994 |
| JP | 08-150125 | 6/1996 |
| JP | 2001-141430 A | 5/2001 |
| JP | 2001-249008 A | 9/2001 |
| WO | WO95/26512 | 10/1995 |
| WO | WO9847117 A1 * | 10/1998 |

* cited by examiner

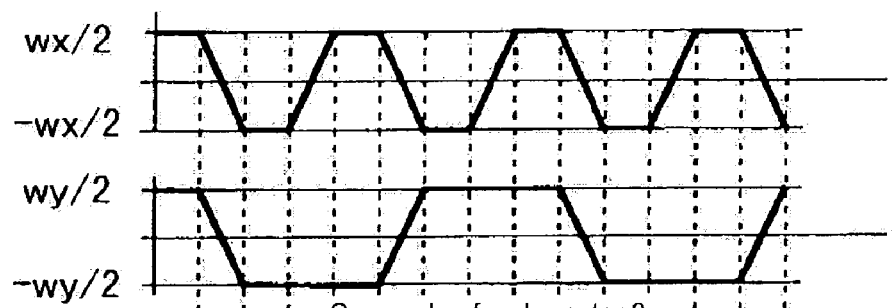
Fig. 32A
Fig. 32B
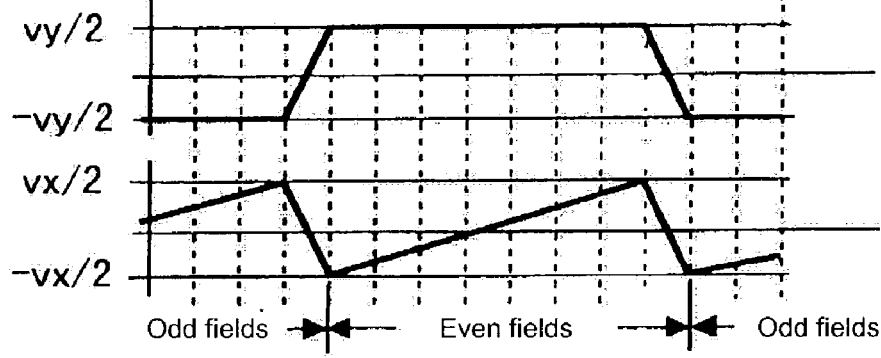
Fig. 32C
Fig. 32D

THREE-DIMENSIONAL MONITORING APPARATUS

BACKGROUND OF THE INVENTION

1. Field of the Invention

The present invention relates to a three-dimensional monitoring apparatus suitable for use of detecting a human body coming into, for example, a dangerous area in a production line or an industrial machine and the like in a factory, more specifically, to a three-dimensional monitoring apparatus capable of acquiring position information of an incoming object into a predetermined three-dimensional space to be monitored by using pattern light as a carrier.

2. Description of the Background Art

In recent years, cases bringing a monitoring apparatus for detecting the presence or absence of an incoming object in a predetermined area (a three-dimensional space to be monitored) into a factory and the like have been increased in number for the purposes of preventing operators from being suffered from inclusion accidents due to a variety of equipment and preventing equipments from being damaged due to a sudden incoming of the object.

As for a monitoring apparatus, an area sensor monitoring a predetermined plane by using continuance of a plurality of light beams and a laser-scanning-type sensor monitoring a predetermined plane with scanning laser beams by using a polygon mirror and the like are well known. With using these apparatuses, for example, when the incoming object is detected, it also becomes possible to perform automatic control such as 97 immediately stop of the equipments.

However, these conventional sensors (monitoring apparatuses) have been predicated on so called 'two-dimensional plane monitoring' developing a virtual light detecting surface on a space to be monitored by illuminating and generating an output by reacting only objects crossing (blocking) the detecting surface, so that we would have to say that these apparatuses have not been suitable for monitoring of an arbitrary three-dimensional space to be monitored. That is to say, even in monitoring the arbitrary three-dimensional space to be monitored, there are problems such that only the presence of the incoming of an object from a side in which the light detecting surface has been developed can be monitored (detected) actually and it is impossible to react to an object and the like incoming into the predetermined space to be monitored without passing through the light detecting surface to be monitored.

Furthermore, the conventional sensors basically detect only the presence or the absence of an object blocking the light detecting surface and it is quite impossible to match user's requests even for detecting a state of incoming of the object into the predetermined space to be monitored (for example, how far the object has entered into the predetermined space to be monitored).

SUMMARY OF THE INVENTION

The present invention is noted to the problems above described and it is an object of the invention to provide a three-dimensional monitoring apparatus capable of detecting with high accuracy an incoming of the object into the predetermined space to be monitored by the using pattern light as the detecting medium.

It is another object of the present invention to provide a three-dimensional monitoring apparatus capable of acquiring position information on the incoming object into the predetermined space to be monitored by using the pattern light as the detecting medium.

Other and further objects and effects of the present invention will become apparent to those skilled in the art from a reference to the following specification.

The three-dimensional monitoring apparatus of the present invention comprises an irradiating means for irradiating predetermined pattern light to a three-dimensional space to be monitored, an imaging means for imaging a projection pattern projected by irradiating the pattern light on a surface of an object existing in the space to be monitored and on a surface of a predetermined body composing of a background of the space to be monitored to capture image data and a position measuring means for acquiring position information on an incoming object into the space to be monitored based on the comparison between the image data captured by the imaging means when there is an incoming object in the space to be monitored and standard image data corresponding to the image data captured by the imaging means when there is no incoming object in the space to be monitored.

As for 'pattern light' above described, the 'pattern light' means, for example, a light beam projecting an image (a certain projection pattern) in a certain shape or a pattern when the pattern light is irradiated on a flat screen. In the description of 'projecting', the foregoing 'pattern light' includes such light with a wavelength which is not recognized by human eyes as an infrared ray and the like, and as an example for 'a certain shape or a pattern', a pattern like a grid, a pattern like concentric circles, a pattern like concentric polygons and the like are concerned.

As a specific example for 'an irradiating means' a laser irradiating apparatus is concerned and as an example for 'an imaging means', a CCD (charge coupled device) camera is concerned.

In the description of 'a surface of an object existing in the space to be monitored and on a surface of a body composing of a background of the space to be monitored', a prepared flat screen body is preferably used as the applicable object, so that reflection-efficiency of the pattern light is improved and measurement stability is ensured. In the use of the flat screen body, the 'a body composing of a background' above described is needed to be prepared separately, but it is possible for such a 'wall' which has been existing there since the start of the space to be concerned as the body.

Moreover, as the description of 'corresponding to image data', it is possible for the standard image data not to be acquired directly through the imaging means, in other words, it is possible for the standard image to be inputted directly through an external device such as a PLC (programmable logic controller) so long as the standard image is the image which is 'corresponding to the image data captured by the imaging means when there is no incoming object in the space to be monitored'.

The three-dimensional monitoring apparatus of the present invention monitors by using the pattern light as the carrier (detecting medium), so that the monitoring apparatus can perform not only a flat-type (one-dimensional) monitoring but also a monitoring of the incoming object into the three-dimensional space, and the monitoring apparatus measures an existence position of the object, so that the apparatus is suitable not only for use of detection for existing of the incoming object but also for use of monitoring in the various types of three-dimensional space and use of position measurement, etc.

In the monitoring apparatus of the present invention, preferably, a decision-output means for outputting a device control signal based on the position information calculated by the position measuring means is further equipped.

According to the manner as stated above, it is possible to stop urgently a predetermined facility or device based on the incoming of the object into the space to be monitored and construct easily such a safety system as an automatic operation of an warning lamp, so that it is possible to prevent operators from being suffered from inclusion accidents caused by each machine and facility In the monitoring apparatus of the present invention, preferably, the standard image data is acquired by an instruction by imaging through the imaging means.

According to the manner as stated above, it is possible to stop urgently a predetermined facility or device based on the incoming of the object into the space to be monitored and to construct easily such a safety system as an automatic operation of an alert lamp, so that it is possible to prevent operators from being suffered from inclusion accidents caused by each machine and facility.

Furthermore, generation or occurrence of the pattern light can be concerned in a variety of manners, as the most preferable example, the irradiating means of the monitoring apparatus is composed of such a light source as a laser diode oscillating laser beam and a pattern light generator converting the laser beam irradiated from the light source into the predetermined pattern light.

As for the expression of 'a pattern light generator', an MLA (micro lens alley) or a CGH (computer generated holograph) is suitable for the generator. The MLA and the CGH are generally having high durability because of having no movable parts in them and possible to be reduced in weight of the bodies themselves.

In the monitoring apparatus of the present invention, preferably, the irradiating means has a scanning mechanism capable of scanning the pattern light in the predetermined area by controlling the direction of irradiation of the pattern light and the imaging means is composed to capture the image data corresponding to a combined projection of a plurality of instant projection patterns projected to the space to be monitored in a predetermined direction and at a predetermined timing through the scanning of the pattern light in the space to be monitored by means of the scanning mechanism.

In the manner stated above, it becomes possible to change and adjust range to be monitored based on the adjustment of a scanning range and also to change and adjust a detecting resolution based on the adjustment of the combined projection.

As for change and adjustment described above, the MEMS composed of a light reflector and a support element that is controlled with torsion and rotation through electromagnetic induction to support the reflector rotatably is further preferably used as the scanning mechanism.

An MEMS producing technology has been recently giving attention on its practicality, especially in the monitoring apparatus of the present invention, by using the MEMS of an electro-magnetic induction control without the need for the above described turnable part as the scanning mechanism, such problems as failures due to occurrence of heat of friction and metallic fatigue happened when using the polygon miller and the like, and a life of the monitoring apparatus is expected to be increased.

The monitoring apparatus of the present invention, as described above, acquires position information on the incoming object, for acquiring more detailed position information, preferably comprises the irradiating device as the irradiating means and the imaging device as the imaging means, wherein the position measuring means calculates three-dimensional position coordinates of the incoming object into the space to be monitored based on the principle of triangulation techniques by using position relations between the irradiating device and the imaging device, known shapes of the pattern light and displacements acquired from image data captured by the imaging device when the incoming object entered into the space to be monitored and the standard image data which was captured in advance.

The calculating manner described above shows merely the preferred exemplary, and it is our intention that the foregoing description does not limit the calculating manner for the position information of the present invention only to the calculating manner based on the principle of triangulation techniques.

In another preferred manner of the monitoring apparatus of the present invention for acquiring more detailed position information, the imaging means and the irradiating means are positioned and placed in a manner that an angle which a virtual line connecting the imaging means and the irradiating means forms with a horizontal surface becomes approximately 45°, so that the position information on an incoming object is measured by a parallax.

According to the manner described above, it becomes possible to generate positively 'parallax' which is approximately equal in the directions of the height and the width, so that the measurement by the position measuring means is performed more accurately.

The preferred embodiment of the monitoring apparatus of the present invention further comprises a means for specifying area selected freely as a specified area through a user's operation from the space to be monitored divided into a plurality of areas virtually in advance and also for selecting type of output selected freely through the user's operation from a plurality of types of outputs prepared in advance at every specified area, wherein the position measuring means acquires specified information on the area where the incoming object exists, and the output-decision means outputs device control signal based on the type of output which is set for the area specified through the position measuring means.

As for the expression of "a plurality of types of outputs prepared in advance", for example, an output of device stopping signal, an output of lighting signal such as warning signal, an output of warning operation signal and the like can be provided. Of course, other variety of types of outputs can be further provided and prepared in advance.

The expression of "specified information" means "information for specifying the appropriate area", for example, such information on serial numbers added to every area divided into a plurality of areas.

According to the foregoing manner, device control signals provided to every appropriate area based on the presence or absence of the incoming object into each area can be outputted automatically.

More preferably, the setting for the types of outputs is performed by voxel that is partitioned based on the shape or the pattern of the pattern light.

The expression of "voxel partitioned based on the shape or the pattern of the pattern light" means, as an example for the pattern light shaped like a grid, the voxel partitioned by a grid line and a predetermined virtual cross section.

According to the manner described above, it becomes easy for a user to recognize (specify) areas divided virtually, so that it becomes easy to set the types of the outputs.

In the manner described above, it is advisable for the specified area to image an object in a state of placing the object at desired position in the space to be monitored and to be performed an automatic specifying by extracting an area where the object exists.

The automatic specifying is appropriate to so-called 'teaching', but according to the foregoing manner, it is possible for an area specifying to be performed with avoiding intuitive ambiguity, without error and with reliability.

The preferred another embodiment of the three-dimensional monitoring apparatus of the present invention further comprises a means for specifying an area selected freely as a specified area through a user's operation among the space to be monitored divided into a plurality of areas virtually in advance and for selecting by specified area types of outputs selected freely through the user's operation among the plurality of the types of outputs prepared in advance, wherein the position measuring means measures a moving state of the incoming object based on the time series changes of a plurality of monitoring image data captured sequentially, the decision-output means specifies an predictive arrival area of the incoming object based on the measurement result and outputs a device control signal based on the predictive arrival area and the types of outputs determined in the predicted area.

As for the expression of "measures a moving state of the incoming object", a direction of moving, a moving speed and the like are considered as 'a moving state'.

In the expression of "specifies an predicted arrival area", meanings of the word 'time' which is a reference for the specifying is not added any limitation, that is to say, it is considered for the expression of the word 'time' to be in a manner to specify (predict) an object-arrival area after a defined time (for example, 'after one second'), or to be in a manner to include a plurality of areas at which the object is predicted to arrive within a predetermined time and respectively calculate predicted arrival times at each area for adding the times to a reference of decision for outputs.

According to the manner described above, it becomes possible to perform device control based on the predictions of arrivals of the incoming object to the predetermined areas, it becomes possible to output the control signal by a quick reaction to the incoming object moving at a high speed.

Next, a self-diagnosis function may be added to the three-dimensional monitoring apparatus of the present invention. For example, the function can be added to the three-dimensional monitoring apparatus by providing a self-diagnosis means for recognizing appropriately whether projection pattern based on pattern light irradiated via an irradiating means is matched with predicted projection pattern and for ensuring normal operations of each configuration means at the moment when the matching is recognized.

As another self-diagnosis function for the monitoring apparatus of the invention, a function for detecting automatically the presence or absence of unusual conditions in own operations of the apparatus itself based on whether matching of the specified parts is recognized or not by checking standard image data against monitoring image data captured when the self-diagnosis is performed can be recommended.

As other example of the self-diagnosis function, a function for detecting automatically the presence or absence of unusual conditions in its own operations based on whether an predicted checked pattern is appeared normally in the image data acquired by irradiating directly a part of light irradiated from the irradiating means can be also considered.

In any manners described above, the self-diagnosis function is established, so that error operations for detection due to failures and the like of the monitoring apparatus itself are prevented.

Now considering in an embodiment of the present invention, it seems preferable for the 'self-diagnosis' to be performed before processing of monitoring operations of the three-dimensional monitoring apparatus. More specifically, for example, a means for repeating alternatively (Self-diagnosis→monitoring→diagnosis→monitoring, etc.) one time processing of a self-diagnosis and one time processing of a monitoring operation (for example, processing of one time of image capturing is defined as one time processing) and a means for performing one time processing of self-diagnosis when starting up the monitoring apparatus then for monitoring repeatedly (self-diagnosis→monitoring→monitoring, etc.) can be considered in the embodiment. During the 'self-diagnosis', if an unusual condition is found in any one of configuration elements such as the irradiating means, the scanning means and the imaging means of the three-dimensional monitoring apparatus, it is preferable for the monitoring apparatus to disable irradiating a predetermined pattern light and stop starting of the monitoring operations, or it is possible to output a predetermined output to inform NG as a result of the self-diagnosis to outside. Simultaneously, it is possible to bring a device to be monitored into such safety processing as stopping them.

Moreover, a plurality of the monitoring apparatuses described above can also be used simultaneously to monitor the space to be monitored from a plurality of directions.

BRIEF DESCRIPTION OF THE DRAWINGS

FIGS. 32A, 32B, 32C and 32D are a timing chart of contents of apparatus control for the self-diagnosis processing in another embodiment.

DESCRIPTION OF THE PREFERRED EMBODIMENTS

The following description provides a detailed explanation on a preferred embodiment of the three-dimensional monitoring apparatus of the present invention in reference to attached drawings.

Figure 1:
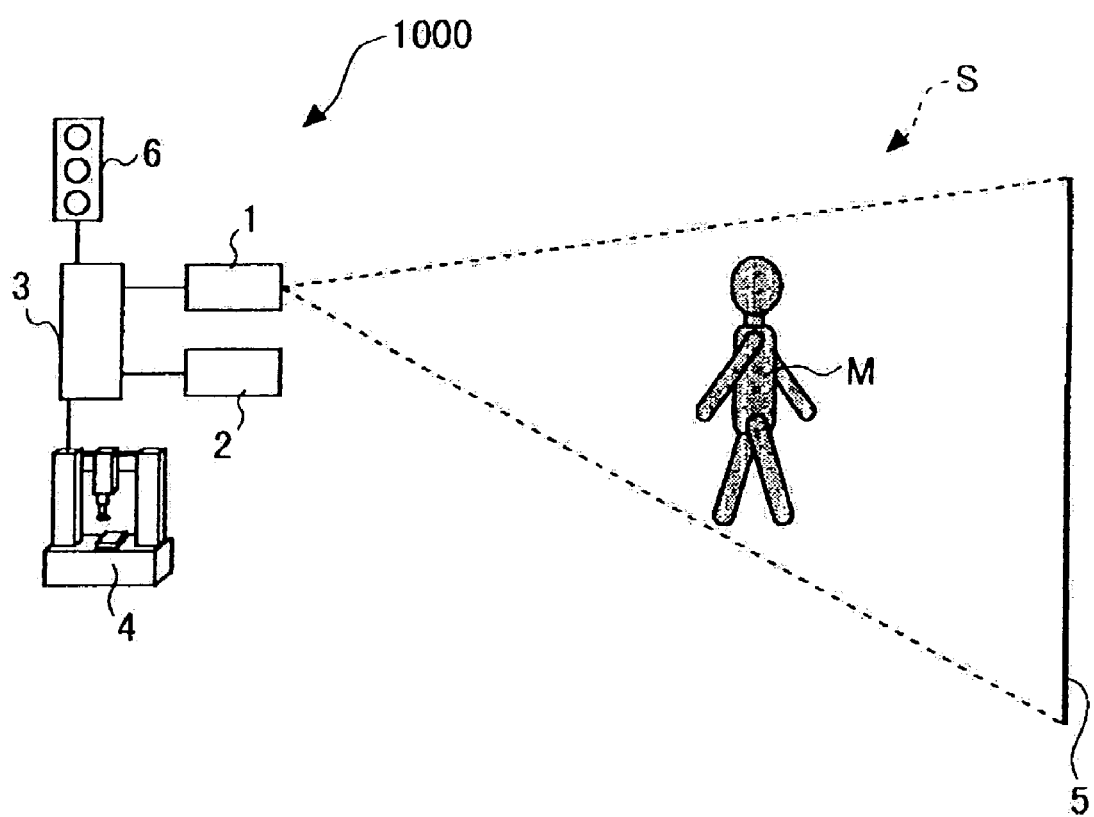
FIG. 1 is an illustration of the whole configuration of a three-dimensional monitoring apparatus of the present invention.

Referring first to the consideration of FIG. 1, FIG. 1 illustrates the whole of a configuration and an outline of operations of the three-dimensional monitoring apparatus in the embodiment. As illustrated, a three-dimensional monitoring apparatus 100 comprises a light source unit 1 as an irradiating means, a camera unit 2 as an imaging means and a controller 3 to control the overall units; a light source unit 1 and a camera unit 2.

The light source unit 1 irradiates a predetermined laser pattern light (hereafter referred to as a pattern light) to a three-dimensional space S to be monitored (hereafter referred to as a monitoring space). In the embodiment, a screen 5 is placed at the rear of the monitoring space S, a projection pattern (in the embodiment, an infrared projection which is not recognized by human eyes) based on the pattern light irradiated from the unit light source 1 is displayed on the screen 5.

When incoming an object such as a human or a matter (hereafter referred to as an incoming object M) into the space S, the infrared pattern projection displayed on the screen 5 is changed. With imaging the changing pattern image by the camera unit 2 and performing image processing, the position and the moving direction of the incoming object M (in FIG. 1, a human is illustrated) are detected.

The controller 3 controls the light source unit 1 and camera unit 2, and also performs outputs according to the detected position and the moving direction of the incoming object M in the monitoring space S, more specifically, in the embodiment, outputs light on-off control signals (in the embodiment, 'stop operation (red)', 'warning (yellow)' and 'no reaction (blue)' to a signal lamp 6 and also outputs control signals 'operation start (ON)' and 'operation stop (OFF)' to a facility device 4 to be controlled. It is decided which signal is outputted according to the detected position and the moving direction of the incoming object M based on the setting of types of outputs set freely by the user through the controller 3.

Figure 2:
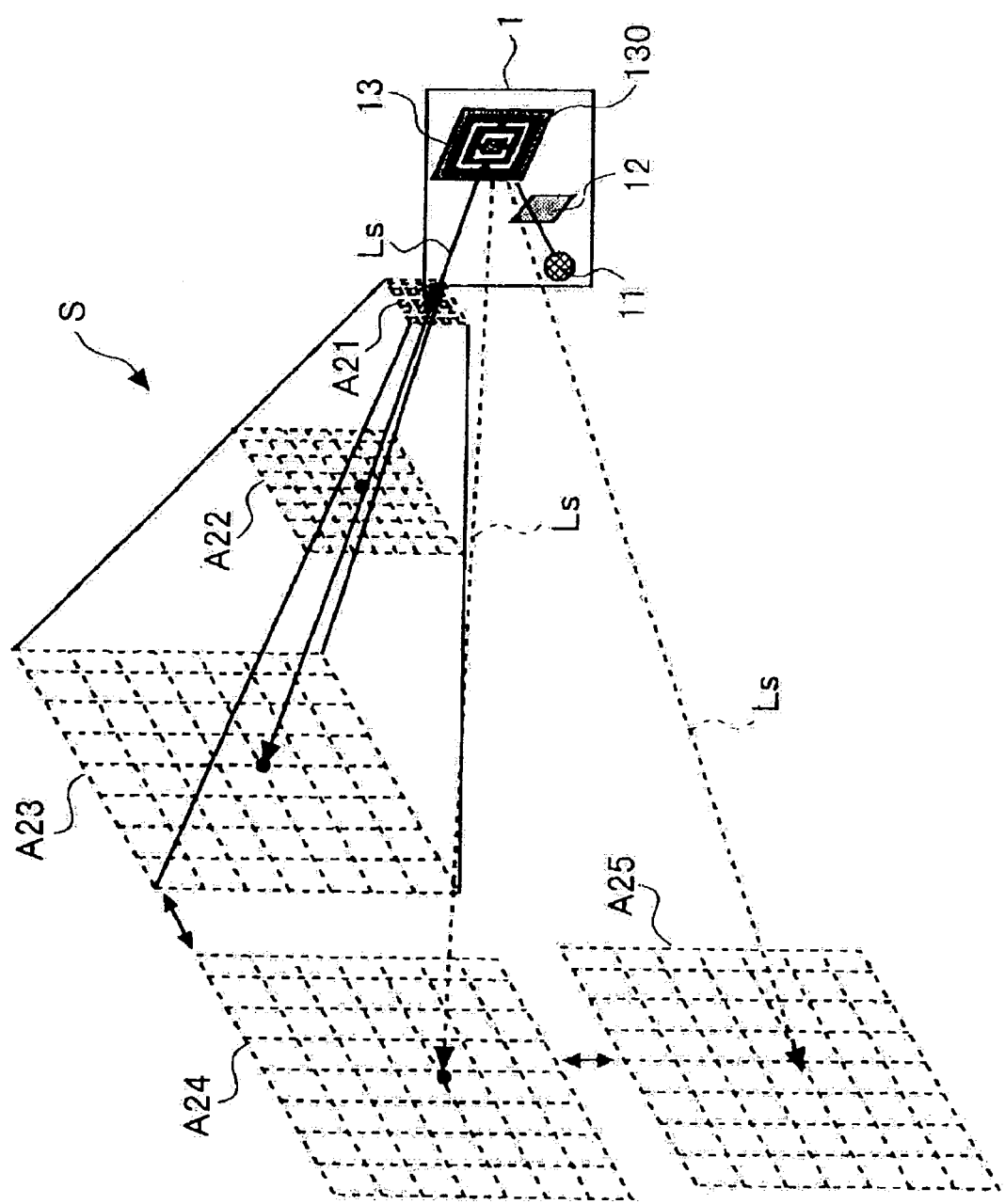
FIG. 2 is a schematic illustration of a configuration and contents of operations of a light source unit.

Referring to FIG. 2 illustrating details on the light source unit 1, the light source unit 1 comprises a light source element 11 to oscillate an infrared laser beam, an MLA (micro lens array) 12 as a pattern light generator to convert the infrared laser beam projected from the source element 11 into a predetermined pattern light and a MEMS 13 as a scanning mechanism having a miller plane (see FIG. 3) under an operation control (a vibration control) by electromagnetic induction and conducting the pattern light generated by the MLA 12 to any position in the monitoring space S. In FIG. 1, reference symbol Ls indicates a light axis of the pattern light (a virtual expanded line of a laser beam light axis projected from the light source element 11).

Intensity of the infrared laser beam irradiated from the light source element 11 is controlled not to exert adverse effects to a human body and the infrared laser beam is converted into pattern lights (patterns are illustrated as referred symbols A21-A25 in FIG. 2) shaped like a grid (shaped like a net). By reflecting the pattern light in the direction of a predetermined direction through the miller plane of the MEMS 13, the pattern light is scanned in the monitoring space S. The controller 3 performs oscillation controls and ON/OFF controls of the light source element 11 and operation controls of the MEMS 13.

As described later, the light source unit 1 furthermore comprises a light source element 14 for monitoring (a visible laser beam light source) and a half miller 15 to set the monitoring space S (see FIG. 10).

Figure 3:
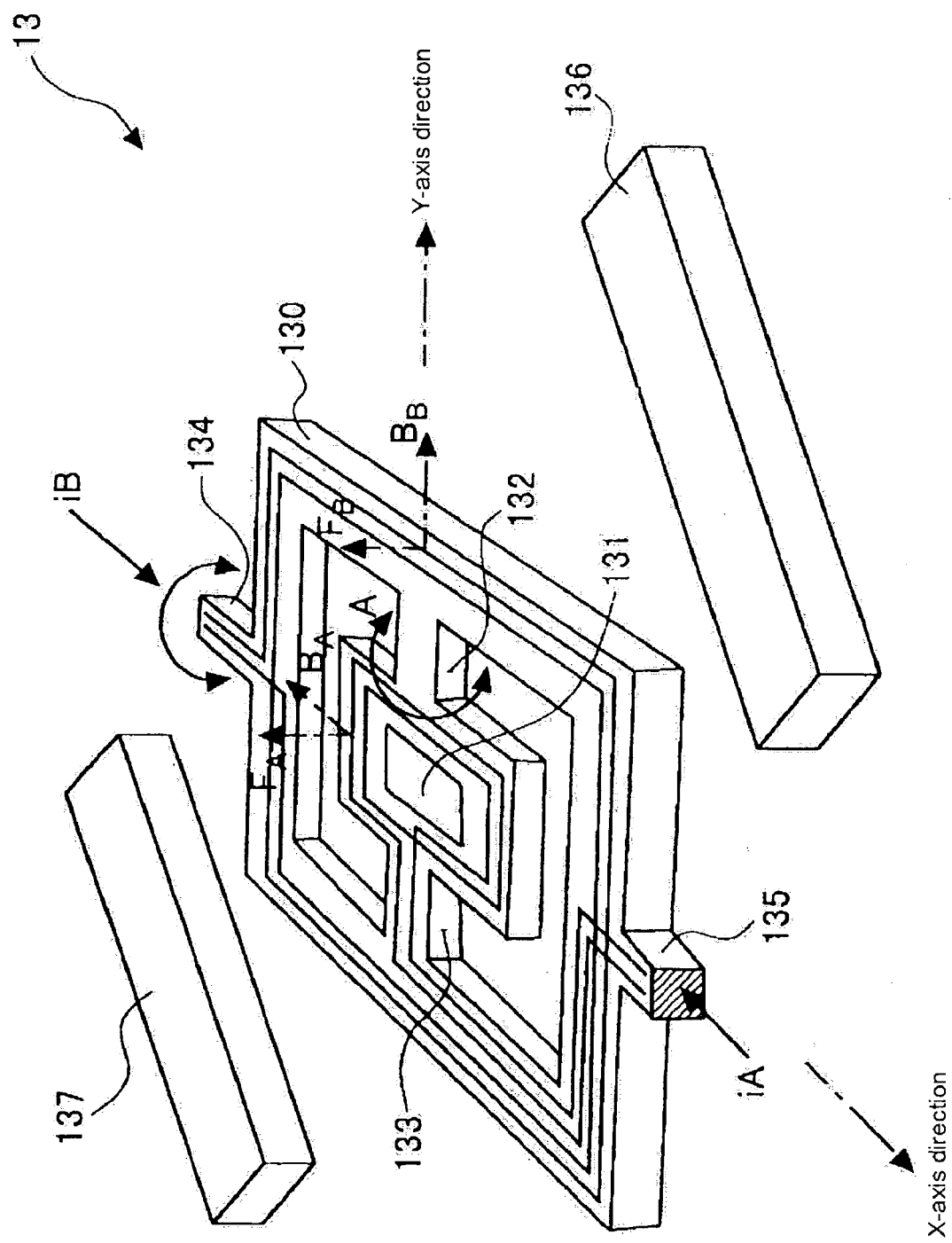
FIG. 3 is an illustration of a configuration of an MEMS adapted as a scanning mechanism.

Referring to FIG. 3, details of the MEMS 13 is described as follows. In FIG. 3, torsion bars (torsion axes) indicated as reference numbers 134 and 135 are illustrated, around the torsion bars 134 and 135 a silicon board (not illustrated) is further connected (see MEMS 134 in FIG. 2), and reference numbers 136 and 137 in FIG. 3 indicate permanent magnets for electro-magnetic induction.

The MEMS 13 used in the embodiment has a miller plane 131 arranged on a silicon substrate 130 and a coil pattern illustrated with a sequential line in FIG. 3 is formed on a surface of the silicon substrate 130 on which the miller plane 131 is mounted. Vibration control is enabled in the directions of x-axis and y-axis illustrated in FIG. 3 within a predetermined angle range with rotating axes of torsion bars (both hands of the silicon substrate 130) referring to numbers 132,133,134 and 135 in FIG. 3.

More specifically, while magnetizing a magnetic field B in the specific directions BA and BB, when feeding currents i (iA and iB) through a coil, a rotation torque is generated by Lorentz forces F (FA and FB), the silicon substrate 130 (the miller plane 131) can be vibrated up to the position where the forces F match with restoring forces of the torsion bars (torsion axes) 132,133,134 and 135. According to the MEMS 13, by the torsion bars 132 and 133 in the direction of x-axis and torsion bars 134 and 135 in the direction of y-axis, the irradiating direction of the pattern light can be controlled freely.

Then, in the embodiment, the light source unit 1 is configured as described above, so that following effects a) and b) are produced.

a) It becomes possible to generate a variety of pattern light such as shaped like circle and like concentric polygon not limited to the pattern light shaped like a grid by changing MLA.

b) In the MLA 12 and the MEMS 13, there is no such movable part as a polygon miller generating friction, so that expansion of life of the monitoring apparatus can be expected.

As a pattern light generator, a CGH (computer graphics hologram) can be adapted instead of the MLA 12, and in this case, the same effects a) and b) described above can be produced.

Figure 4:
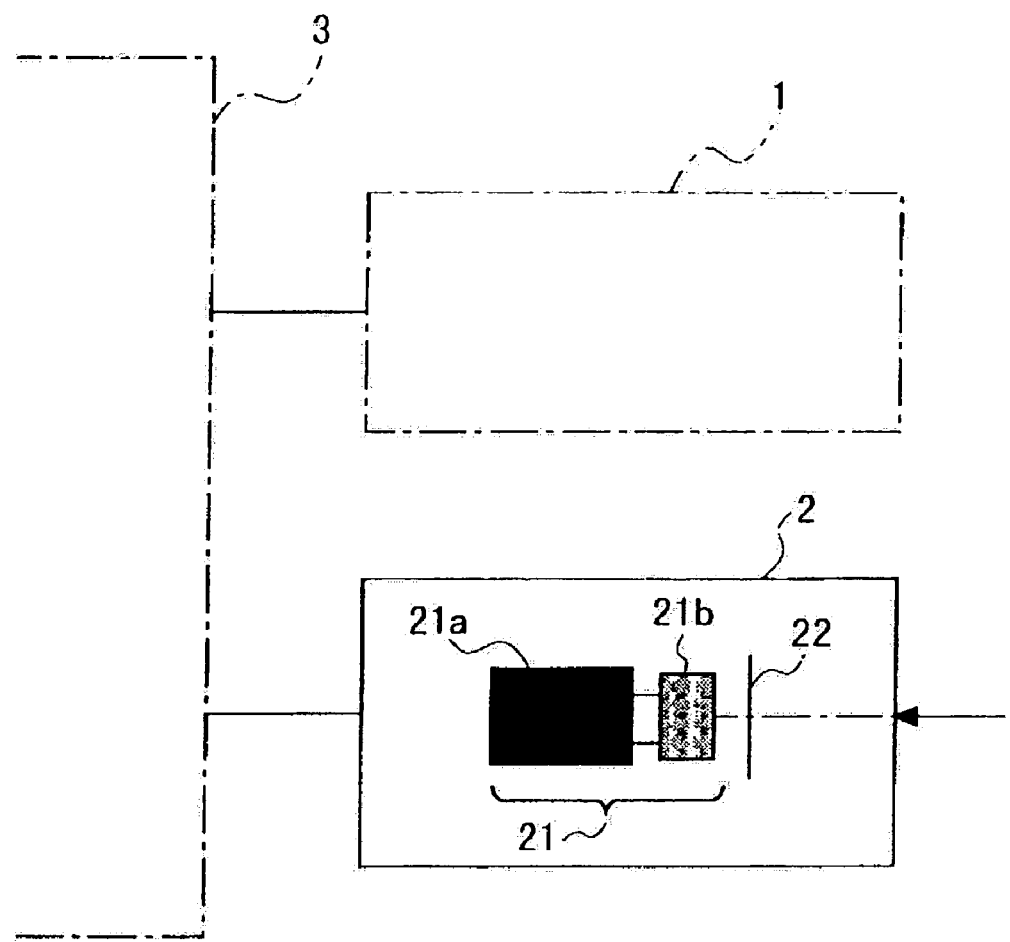
FIG. 4 is an illustration of a schematic configuration of a camera unit.

Referring to FIG. 4, a configuration of the camera unit 2 will be explained. As shown in FIG. 4, The camera unit 2 is composed of a camera 21 including an imaging device 21a and a shutter mechanism 21b and of a band path filter (BPF) 22 corresponding to wavelengths of an infrared beam irradiated from the light source element 11, projection patterns projected on the screen 5 and projected on the incoming object M are imaged through a shutter timing control by the controller unit 3. In the embodiment, a CCD camera is used as the camera 21, so that the mechanism 21b is not existed actually, but for the explanation of the camera unit 2, the mechanism 21b is illustrated in FIG. 4.

In the embodiment, the band path filter 22 prevents from incoming of external fluctuated light such as fluorescent lamp light and sunlight.

Figure 5:
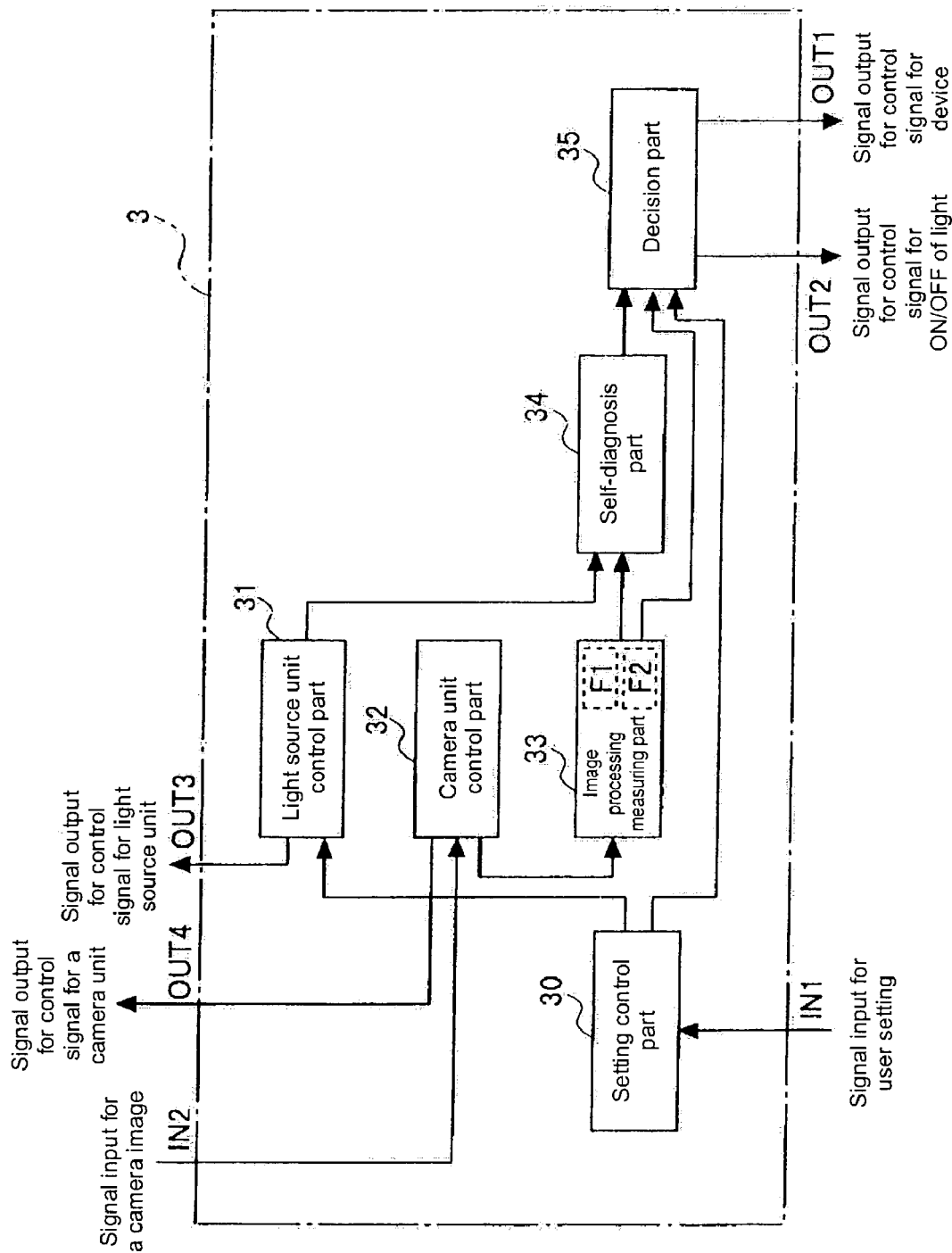
FIG. 5 is a block diagram of a configuration of a controller unit.

A block diagram in FIG. 5 illustrates a configuration of the controller unit 3. As shown in FIG. 5, the controller unit 3 comprises a setting control part 30, a light source control part 31, a camera unit control part 32, an image processing measuring part 33, a self-diagnosis part 34 and a decision part 35.

The controller unit 3 illustrated in FIG. 5 comprises two inputs indicated as 'a signal input for a user setting IN1' and 'a signal input for a camera image IN2' and four outputs indicted as 'a signal output for a device control OUT1', 'a signal output for a control signal for a light ON/OFF OUT2', 'a signal output for a control signal for a light source unit OUT3' and 'a signal output for control signal for a camera unit OUT4'.

The setting control part 30 switches operation modes of the three-dimensional monitoring apparatus 1000 based on the user setting input IN1 and also a variety of setting values (data) acquired through the user setting input IN1 into a predetermined memory.

In the embodiment, four modes are prepared as the operation modes as follows.

1) A Monitoring Mode (Contents) In a monitoring mode, a position or a moving direction of the incoming object M in the monitoring space S are detected to generate an output corresponding to a detecting result.

2) A Setting Mode for Space to be Monitored (Contents) In a setting mode for space to be monitored, a range of the monitoring space S is set.

Figure 6A:
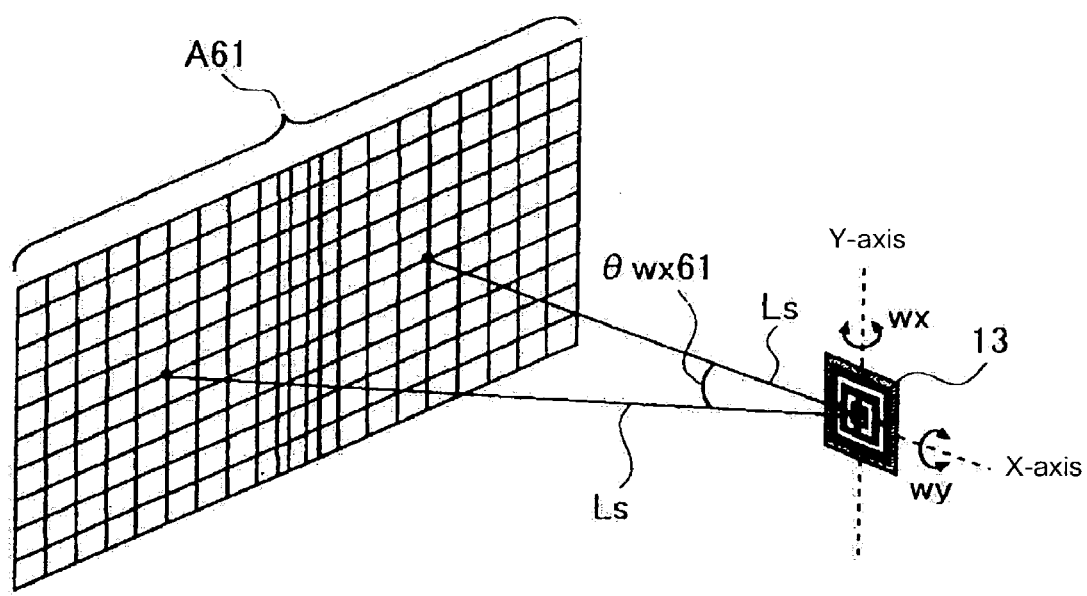
FIGS. 6A and 6B are an illustration of relations between a swing angle of an MEMS and a monitor range and a detecting resolution.

(Detailed description) FIG. 6 shows relations between a vibration angle of the MEMS 13, and a monitor range and a detecting resolution. The light source unit 1 scans the pattern light shaped like a grid in the monitoring space S by operation control of the MEMS 13. As shown in FIG. 6A, if the vibration angle (hereafter called a swing angle) θ of the MEMS 13 (the miller plane 131) is set at wide (shown as θwx61) to extend a scanning range (shown as a projection range of a combined projection pattern indicated by a reference number A61 in FIG. 6), a relative wide range is permitted to be monitored.

Figure 6B:
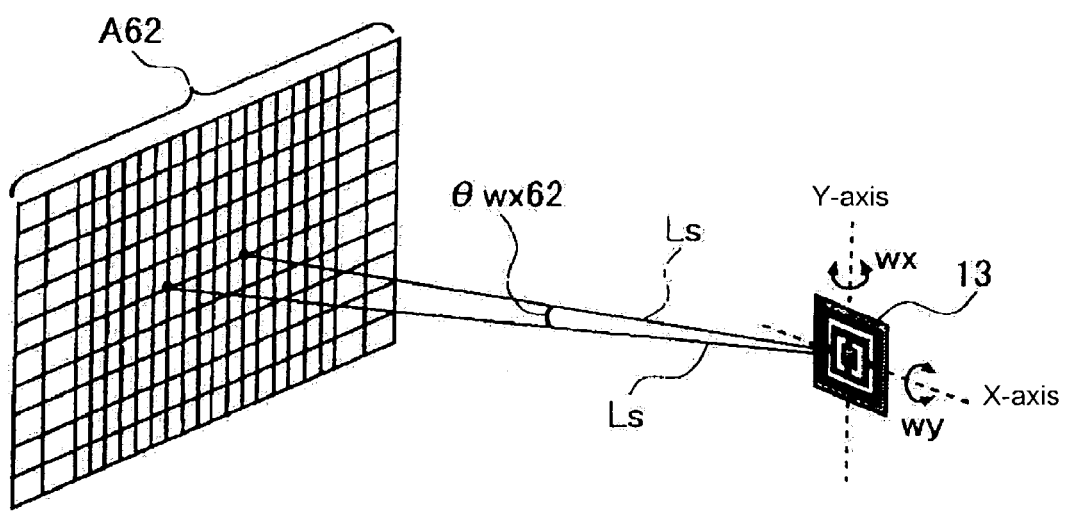

On the other hand, as shown in FIG. 6B, if the swing angle θ is set at narrow (shown as θwx62), to narrow the irradiating range (shown as a projection range of the combined projection pattern indicated by a reference symbol A62 in FIG. 6), a density of grid lines (the number of grid lines per a unit area) becomes in high and detection with a relative high resolution is permitted.

In the setting mode for space to be monitored, the swing angle θwx (or θwy) is accepted through a predetermined user's operation.

In the embodiment shown in FIG. 6, the MEMS 13 scans (swings) the pattern light only in the direction of the x-axis (around of the y-axis), but as mentioned above, the MEMS 13 adopted in the present embodiment can scan the pattern light in both direction of the x-axis and the y-axis.

3) A Calibration Mode (Contents) In a calibration mode, distance data L (refer FIG. 8A) is acquired, and the pattern light is irradiated during a state that the incoming object M does not exist in the monitoring space S then the projection pattern projected on the screen 5 is imaged by the camera unit 2 to capture a standard image (hereafter called a reference image).

(Detailed description) In the embodiment, as will be described later, a distance up to the incoming object M is calculated by the principle of triangulation techniques based on the comparison between an image (hereafter called a monitoring image) which is imaged by the camera unit 2 in the monitoring mode and the reference image. The distance data L calculated in the calibration mode is used for a self-diagnosis described later.

4) Setting Mode for Types of Outputs (Contents) In a setting mode for types of outputs, outputs corresponding to the position and the moving direction of the incoming object M in the monitoring space S are outputted.

(Detailed description) The monitoring space S whose rage is set in the setting mode for space to be monitored is partitioned into a plurality of virtual voxels (Volume Pixel)(4× 4×3 pieces in the embodiment). In the embodiment, it is possible to preset any types of outputs by voxel (or by a plurality of voxels) according to the presence or absence of the incoming object into each voxel.

In the embodiment, three kids of outputs such as 'stop', 'warning' and 'no reaction' are prepared as the types of outputs. A setting manner will be described later, types of outputs setting data which is set in the setting mode for types of outputs is used by a decision part 35, and as for information, a default value for the setting is defined as 'warning' as shown in FIG. 6B.

Figure 7:
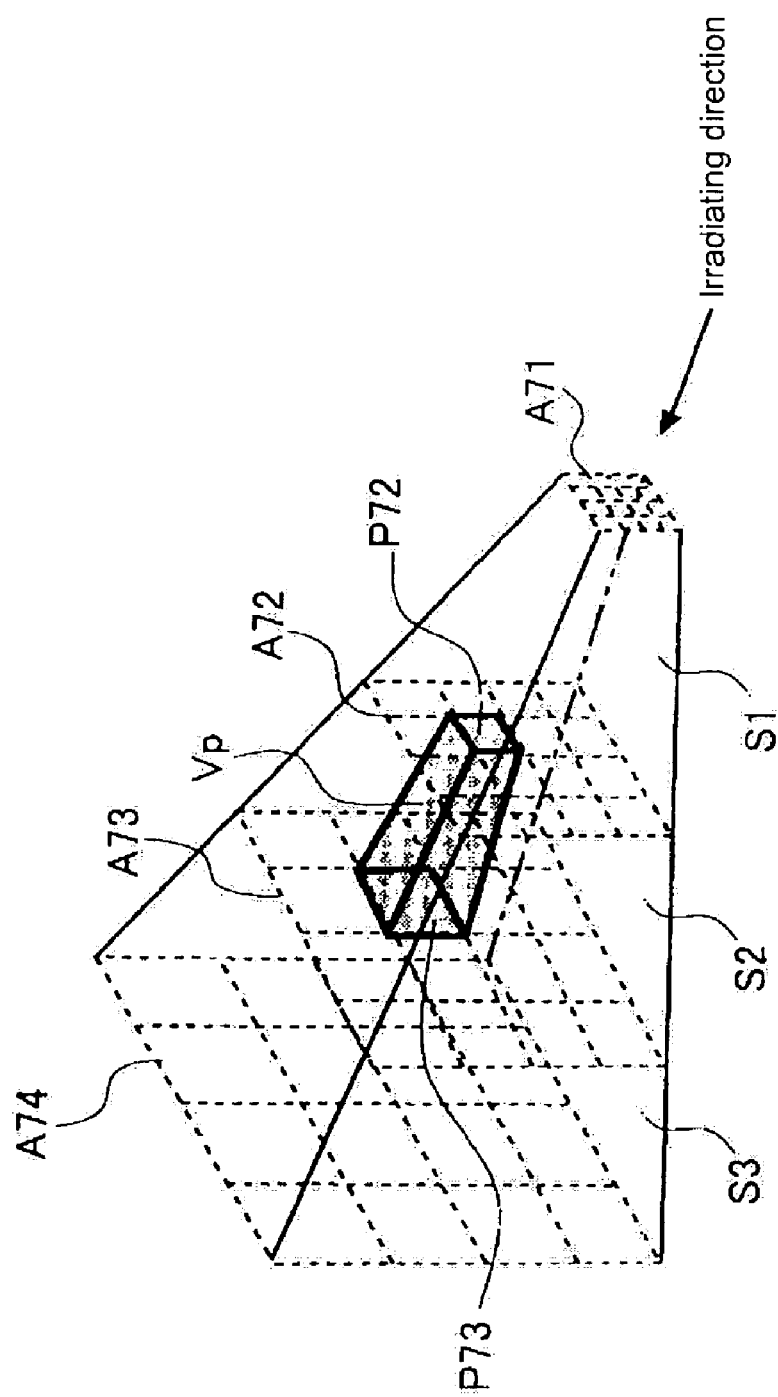
FIG. 7 is a schematic illustration of contents of a split of voxel in a space to be monitored.

Grid patterns shown as reference symbols A71-A74 in FIG. 7 indicate conceptual virtually combined pattern projection recognized in each divided surface splitting the monitoring space S into three in forward and backward directions (in the embodiment generating combined pattern projection by scanning the pattern light, the combined pattern projection is a combined 4×4 pattern projection). A voxel Vp shown in FIG. 7 indicates a voxel corresponding to a space between plane areas P72 and P73 partitioned by combined pattern projections A72 and A73 among a central space S2 splitting the monitoring space S into three in forward and backward directions.

Referring again to FIG. 5, the light source unit control part 31 controls operations (swing angles) of the MEMS 13 based on the swing angle defaults ($\theta wx$ and $\theta wy$) stored into the setting control part 30 and also controls ON/OFF and oscillations of the light source element 11 (and a light source element 14 for monitoring which will be described later).

The camera unit control part 32 performs a shutter timing control and an image capturing control of the camera unit 2 to capture the monitoring image and the reference image. Both of the images are stored as binary data into a frame memory F1 or F2 of the image processing measuring part 33 which will be described later. The shutter timing control is performed in reference to a state of an oscillation (an oscillation control signal) of the light source unit control part 31 and a state of an operation (a swing angle control signal) of the MEMS 13.

The image processing measuring part 33 measures a existing position (space coordinates z (x, y)) of the incoming object M by using the principle of triangulation techniques based on the monitoring image and the reference image captured by the control part 32 to output a measurement result to the decision part 35. The image processing measuring part 33 is provided with the frame memory FM1 (for the monitoring image) and FM2 (for the reference image) storing image data captured by the camera unit control part 32.

The self-diagnosis part 34 diagnoses whether the three-dimensional monitoring apparatus 100 works normally or not, more specifically, diagnoses whether the laser unit control part 31 and the camera unit control part 32 work normally based on the image data captured through the camera unit control part 32 every time the image data is captured. The diagnosis result is inputted to the decision part 35.

The decision part 35 decides the signal output for light on-off control OUT2 among the three types of signal outputs OUT1-OUT3 and decides simultaneously the signal output for device control OUT1 to the equipment device 4 based on the result from the measuring part 33, the setting of the space S, the setting of the types of outputs by voxel Vp and the diagnosis result from the self-diagnosis part 34.

Furthermore, it is also possible for the decision part 35 to decide the signal output for device control OUT1 to be 'stop of operation in advance when an incoming of the incoming object M is obvious by predicting the presence or absence of the incoming object M into a predetermined voxel which was specified in advance according to the moving speed and moving direction of the incoming object M (a predictive stop function), and the predictive stop function will be described later.

The three-dimensional monitoring apparatus 100 in the embodiment is described step-by-step as follows.

Figure 8B:
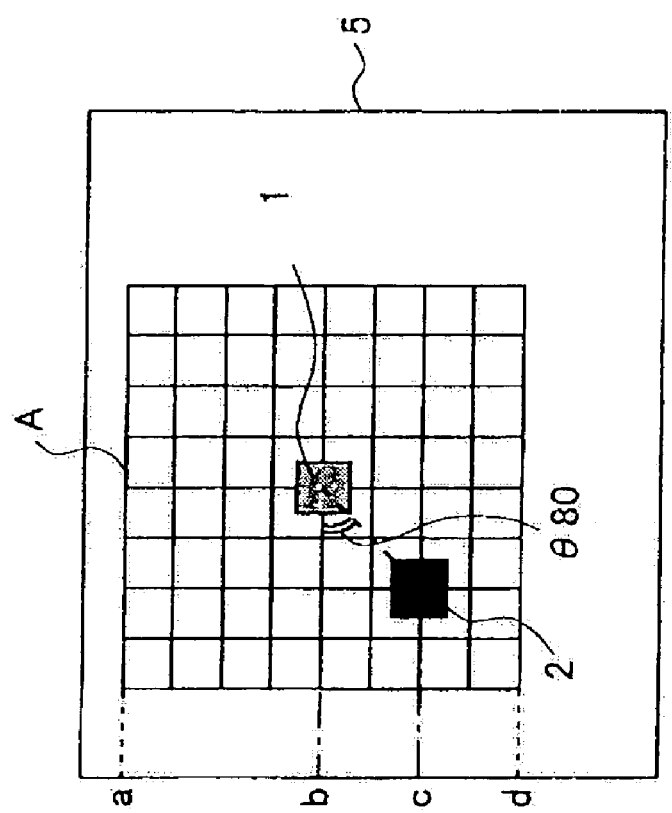
FIGS. 8A and 8B are an illustration of a position relation between the light source unit and the camera unit.
Figure 8A:
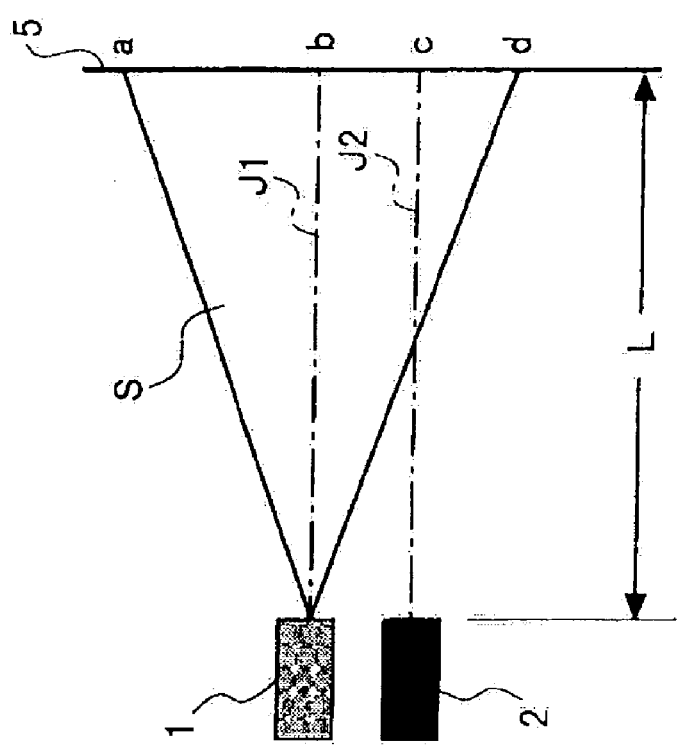

A position relation between the light source unit 100 and the camera unit 2 in the three-dimensional monitoring apparatus 100 in the embodiment is illustrated diagrammatically in FIG. 8. As shown in FIG. 8A, the light source unit 1 and the camera unit 2 are placed nearby each other in a manner that each front plane (in precise, an MEMS plane for the light source unit 1 and a camera lens plane for the camera unit 2) is positioned equidistant from the screen 5 (indicated as a distance L in FIG. 8). Furthermore, the position relation between light source unit 1 and camera unit 2 simultaneously fills following conditions a)-c).

a) A light axis of the light source unit 1 (indicated as a dashed line J1 in FIG. 8) is parallel to a light axis of the camera unit 2 (indicated as a dashed line J2 in FIG. 8). The light axis J1 of the source unit 1 is a normal line of the MEMS plane and the light axis J2 of the camera unit 2 is a normal line of a lens plane.

b) Grid lines in a lateral direction of the pattern light irradiated from the light source unit 1 are parallel to a scanning direction of the x-axis (a scanning direction of an imaging element CCD (charge coupled device) of the camera unit 2) (details will be described later) of image data surrounded by the measuring part 33.

c) The camera unit 2 is placed at the position in a slanting downward direction with an angle 45° of the light source unit 1 (indicated as an angle of $\theta 80$ in FIG. 8B).

The conditions described above are the setting conditions predicted on a applying of a calculation equation for object position measurement that will be described later, and the setting conditions described above are not to be considered to limit the position relation between the light source unit 1 and the camera unit 2.

As a postscript on the foregoing condition c), since the camera unit 2 is designed to be placed at the position in the slanting downward direction with the angle 45° of the light source unit 1, a parallax can be evenly generated to both of the x-axis and the y-axis. For example, even if the camera unit 2 is placed in a upper right, an upper left or a lower right direction of the light source unit 1, same effects can be produced.

Figure 9:
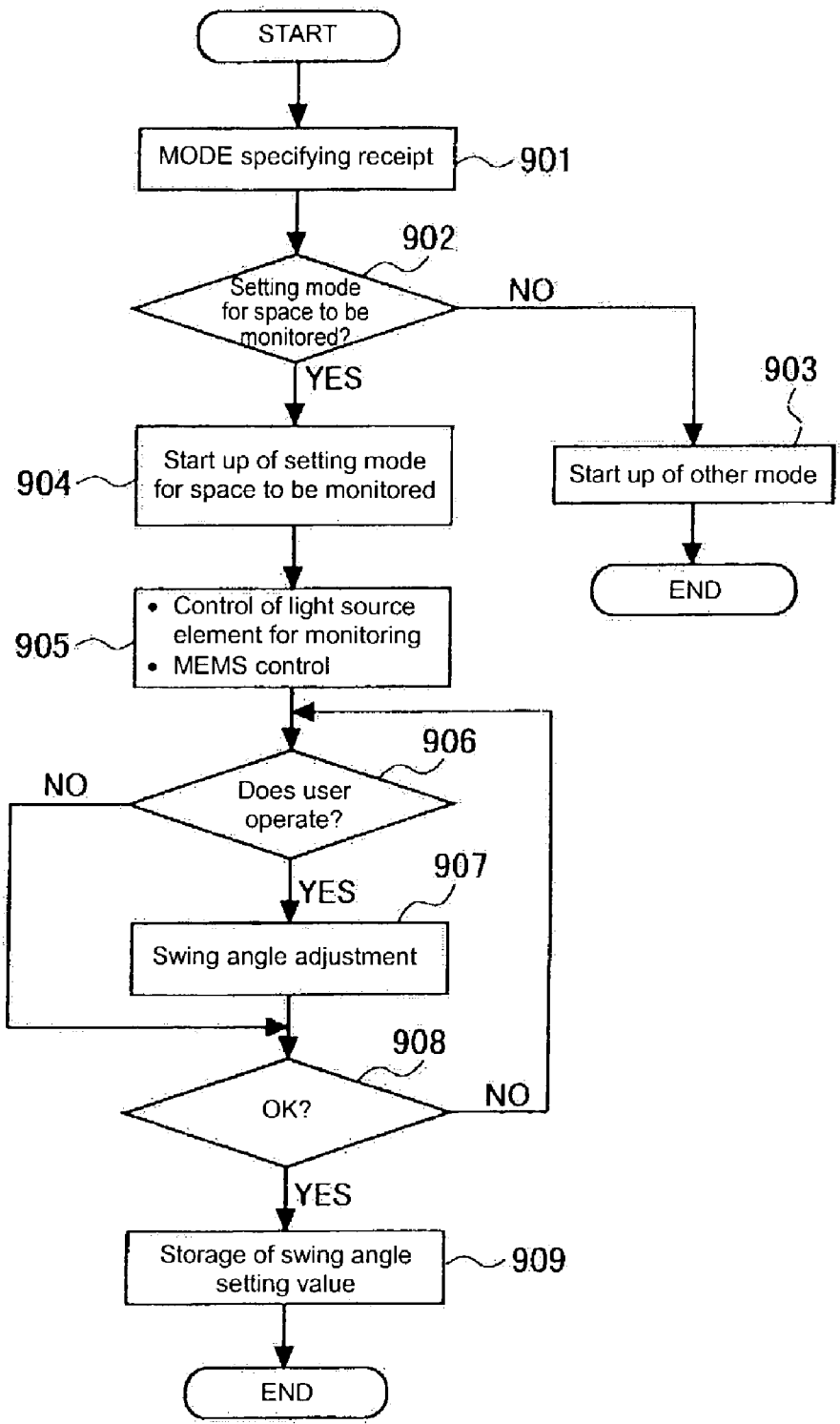
FIG. 9 is a flowchart of contents of a setting mode for space to be monitored.

Operations of the three-dimensional monitoring apparatus in the setting mode for space to be monitored are shown in a flowchart in FIG. 9.

The setting mode for space to be monitored is started up under the condition that the setting mode for space to be monitored is specified through the signal input for a user setting IN1 (YES, in step 901, step 902). If other mode is set by the signal input for a user setting IN1 and the like (No, in step 902), the mode is changed to modes corresponding to each specified mode (step 903).

Figure 10:
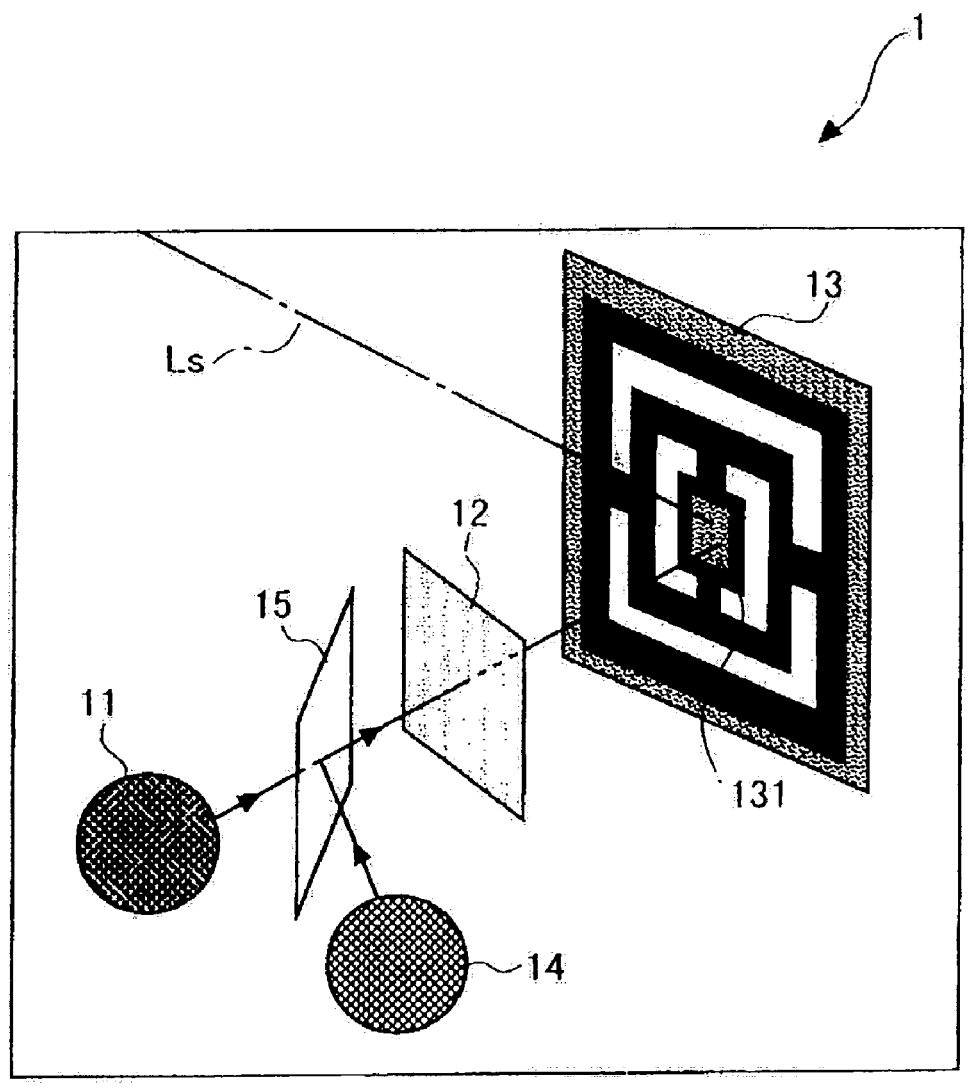
FIG. 10 is an illustration of a setting manner of a light source element for monitoring in the light source unit.

When the setting mode for space to be monitored is started up, the light source element 14 for a monitor on FIG. 10 starts up a laser beam oscillation with a control by the light source unit control part 31, and simultaneously, the MEMS 13 is vibrated in the both directions of the x-axis and the y-axis based on the setting values of swing angles $\theta wx$ and $\theta wy$ stored into a predetermined memory in the setting control part 30(step 905). Only for setting in the first time, defaults are taken as setting values of the swing angles $\theta wx$ and $\theta wy$.

Having been omitted in FIG. 2, but as shown in FIG. 10, the light source element 14 for a monitor is a light source element for a visible laser beam oscillation arranged in the light source unit 1, a laser beam irradiated from the light source element 14 is irradiated to the MLA 12 with the same light axis Ls as a laser beam irradiated from the half miller 15 placed between the light source element 11 and the MLA 12.

Accordingly, visible pattern light having the same pattern that of the pattern light from the light source element 11 is scanned to display a visible combined pattern projection is displayed on the screen 5, and the user can recognize the setting range of the monitoring space S.

Next, when the user operates a lever switch (an operating part) which is not shown in FIG. 10 (YES, in step 906), the swing angle is changed according to the operation (step 907), the combined pattern projection (a scanning range of the pattern light) displayed on the screen 5. After operating the lever switch, when the user pushes a decision button which is not illustrated in FIG. 10, swing angles at that time of pushing are overwritten and stored as new swing angles setting values θwx and θwy into the predetermined memory in the setting control part 30 (step 909), then processing is completed temporarily.

In the present embodiment, therefore, user can set the monitoring space S in accordance with the visible combined pattern projection in the setting mode for space to be monitored.

Figure 11:
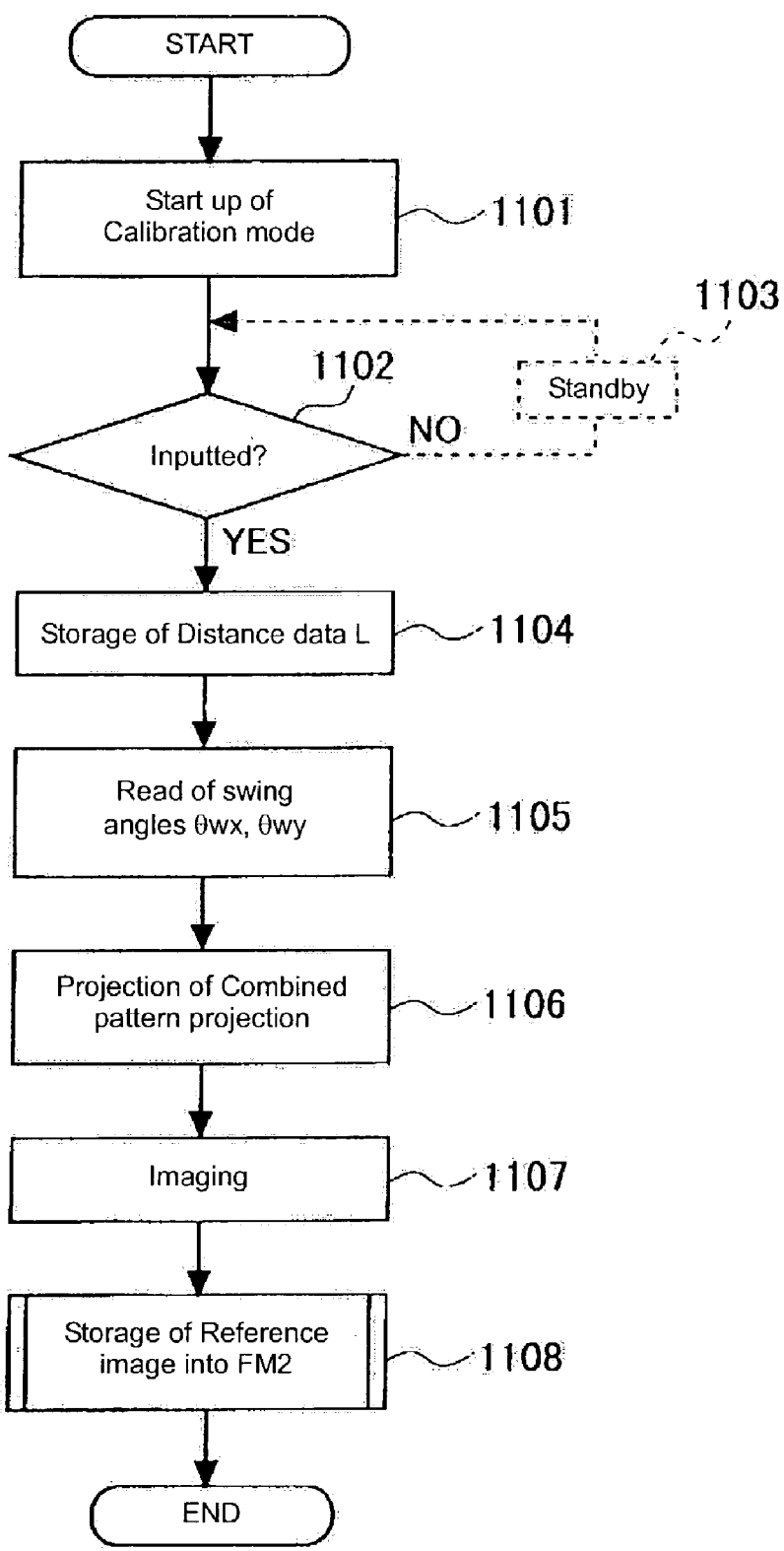
FIG. 11 is a flowchart of contents of a calibration mode.

Operations of the three-dimensional monitoring apparatus in the calibration mode are shown in a flowchart in FIG. 11.

The calibration mode is started up through the signal input for a user setting IN1 under a condition that the calibration mode is specified (step 1101), processing becomes into a state of waiting for an input of the distance data L already described (NO, in step 1102, step 1103). When the user inputs the distance data L through a key operating part (for example a ten key) of the controller 3 (YES, in step 1102), the distance data L is stored into the predetermined memory in the setting control part 30 (step 1104).

Next, the swing angle setting values θwx and θwy of the MEMS 13 are stored into the setting control part 30 (step 1105).

The light source unit control part 30 performs laser oscillation control of the light source element 11 and performs swing angle control of the MEMS 13 based on the read swing angle setting values θwx and θwy to project the combined pattern projection on the screen 5 (step 1106).

The camera unit control part 32 controls the camera unit 2 to image the combined pattern projection projected on the screen 5 (step 1107) and encodes the captured image data in binary form to store into the frame memory FM2 in the image processing measuring part 33 (step 1108). As mentioned above, the reference image is captured in the calibration mode only in the state of the absence of the incoming object M in the monitoring space S.

Figure 12:
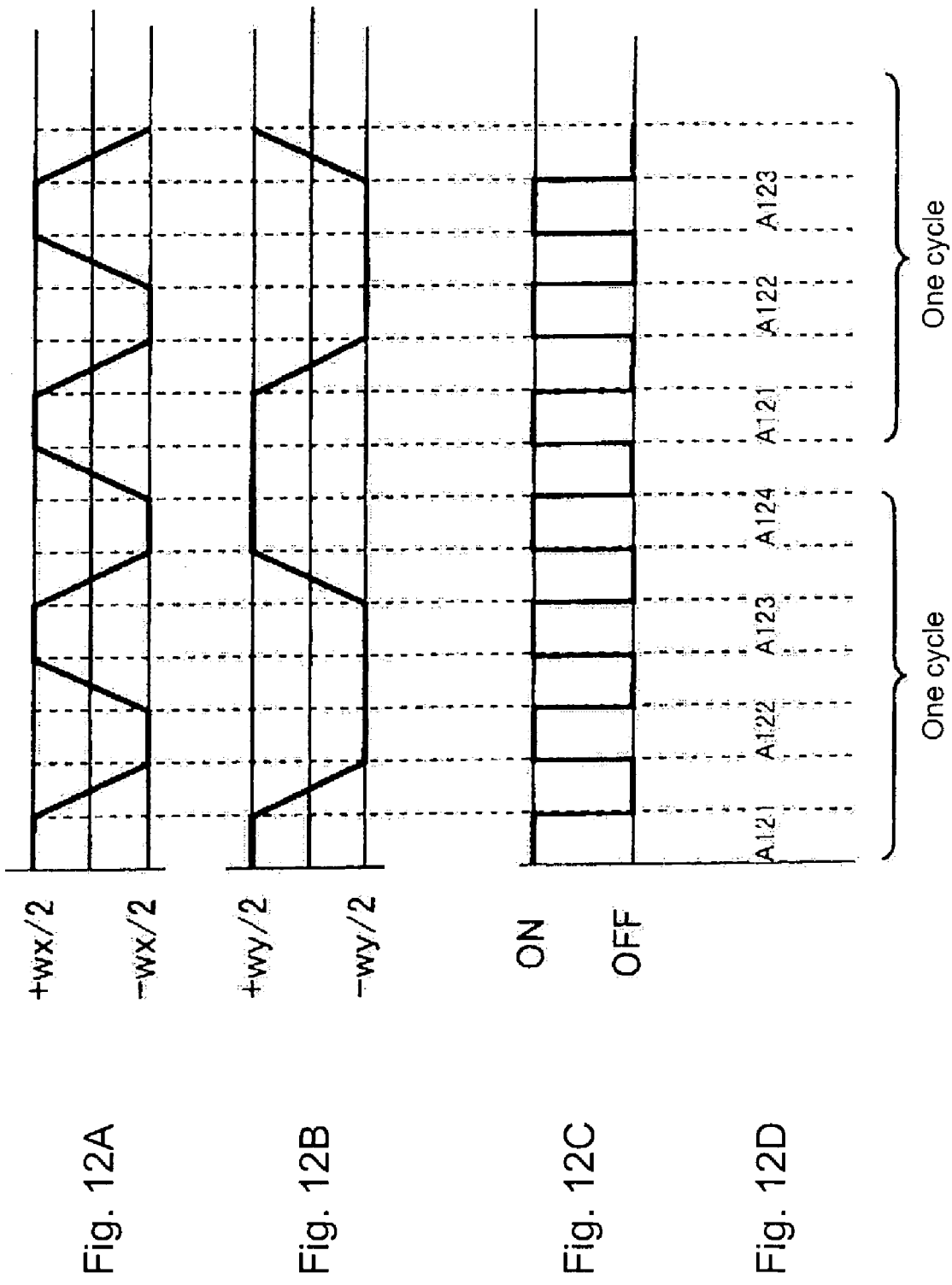
FIGS. 12A, 12B, 12C and 12D are a timing chart of a relation between swing angle control of the MEMS and control of oscillation and imaging timing of a laser light source element.

In the flowchart in FIG. 11, when controlling the swing angles, the control part 30 outputs to the source unit 1 the control signal shown in the timing chart in FIG. 12.

In FIG. 12A shows a control signal regarding to the swing angle in the direction of the x-axis θwx, FIG. 12B shows a control signal regarding to the swing angle in the direction of the y-axis θwy, FIG. 12C shows an oscillation control signal (ON/OFF control signal) of the light source element 11 and FIG. 12D shows instant pattern projections A121-A124 (shown in FIG. 13) projected at respective timings.

Figure 13:
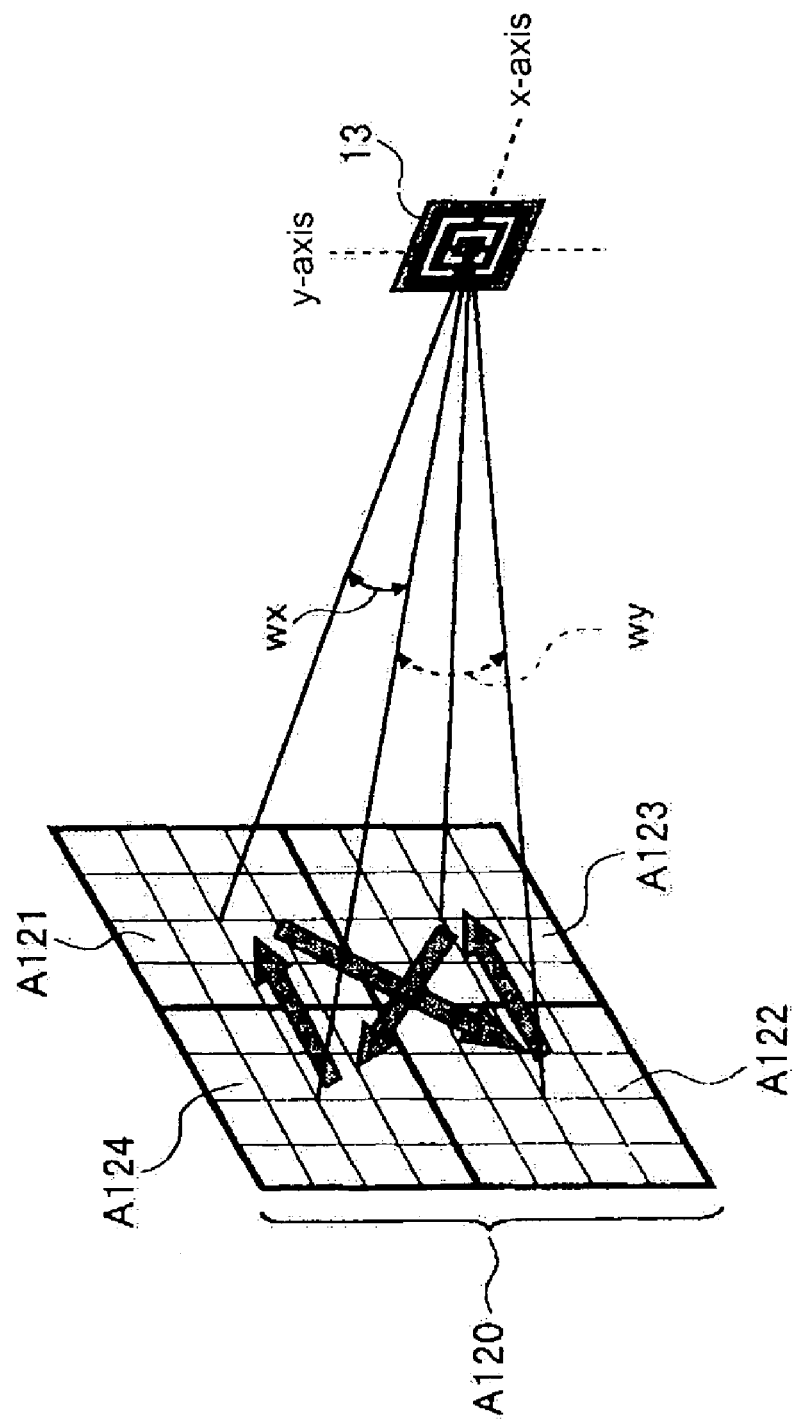
FIG. 13 is an illustration of a combined pattern projection of one cycle of a character 8.

In the calibration mode, the light source unit control part 31 outputs to the light source unit 1 swing angle control signals of the MEMS 13 shown in FIG. 12A and FIG. 12B and a light ON/OFF signal to the light source element 11 shown at FIG. 12C. In FIG. 13, pattern projection indicated as a reference symbol A120 shows a combined pattern projection projected on the screen 5.

The camera unit control part 32 monitors the control signal from the light source control part 31 and performs open-close control to the shutter mechanism 21b of the camera unit 2 to record one cycle of a character 8 (four instant images in the embodiment) as a single image. The image processing measuring part 33 stores the single image of one cycle of a character 8 into the frame memory FM2 for reference image.

Next, the image processing measuring part 33 calculates an angle θ which each grid line of a vertical direction (the direction of the y-axis) and a horizontal direction (the direction of the x-axis) of the combined grid pattern projection forms with the z-axis (a light axis of the laser beam). The angle θ is used to calculate a distance up to the incoming object M.

Figure 14A:
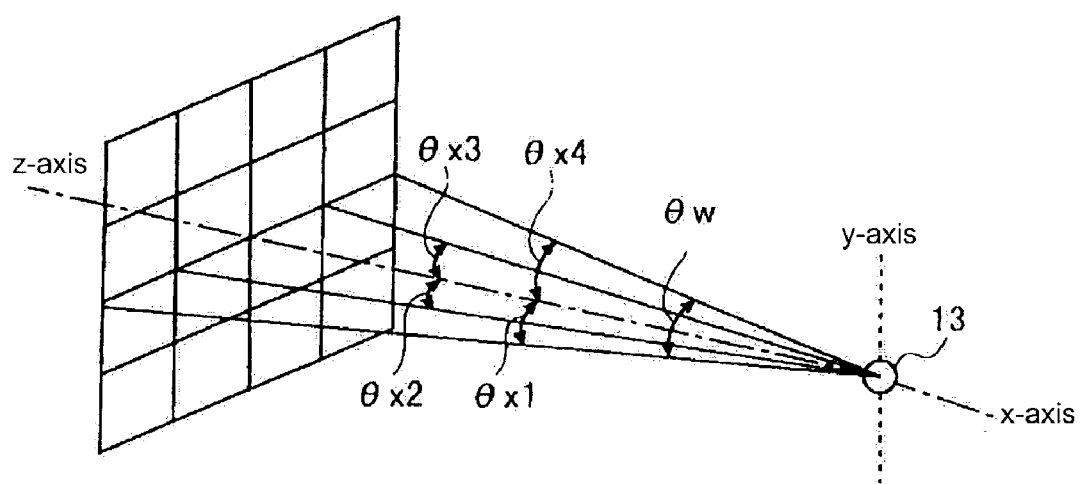
FIGS. 14A and 14B are an illustration of already known angles $\theta x$ and $\theta y$ which a light axis forms with each grid line of gird patter light.

Hereby, a distance between the light source element 11 of the light source unit 1 and the MLA 12 is already known, angles (shown in FIG. 14A as θx1-θx4) which the z-axis forms with each vertical grid line of a basic grid pattern projection (shown as 4×4 grid pattern light in the embodiment) and angles (θy1-θy4) which the z-axis forms with each horizontal grid line are also known from a design viewpoint. A swing angle control signal of the MEMS 13 and swing angles (setting values) of the MEMS 13 shown in FIG. 12A and FIG. 12B are also already known. (Consequently, the combined image projection shown in FIG. 13 is projected by swinging the swing angles of the MEMS 13 up to −θw/2 to +θw/2 in the direction of the x-axis and up to −θw/2 to +θw/2 in the direction of the y-axis.

Figure 14B:
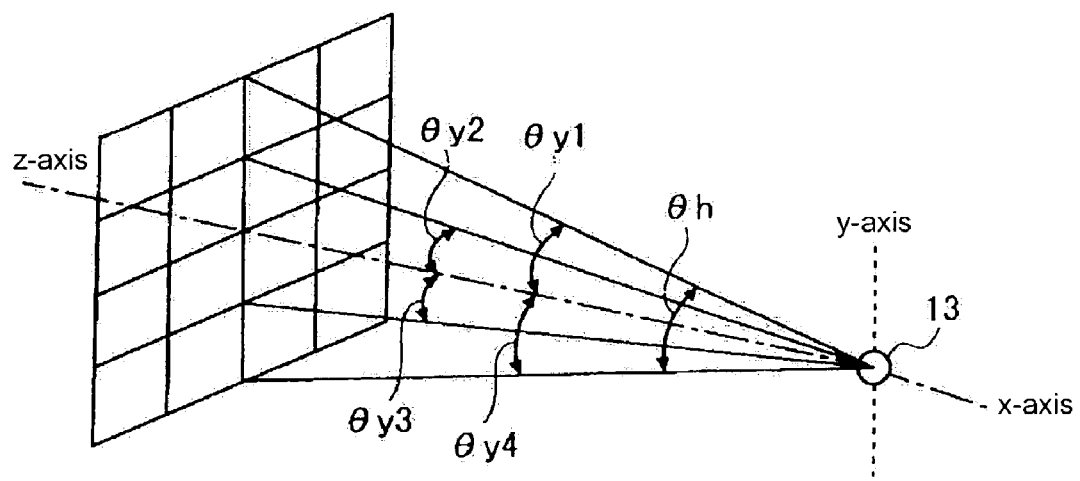

If the MLA 12 generating the grid pattern light shown in FIG. 14, an angle θx which a vertical grid line at the left end of the combined pattern projection forms with the z-axis shown in FIG. 13 is expressed in an equation θx=−θw/2−θx1. Similarly, an angle that each vertical and horizontal grid line forms with the z-axis can be calculated from swing angles of the MEMS 13 and information already known from a design viewpoint.

Hereby, for the sake of clarity, pattern light shaped like a 4×4 grid is described as an example, but even after increasing of grid in number, these angles can be calculated similarly.

For the next, coordinates (xf, yf) on image elements (CCDs) of each vertical and horizontal grid line are retrieved from the data stored into the frame memory FM2 to store a retrieval result in, for example, a data structure in a C language is as follows.

[Equation 1]

```
typedef struct grid_v{/*a data structure for vertical grid
line storage*/
    int angle/* an angle from the z-axis*/
    int y_min; /*a minimum value of Y*/
    int y_max; /*a maximum value of Y*/
    int xf [MAX_YSIZE]; /* x coordinates of grid lines on a
frame memory*/
        /*MAX_YSIZE:a maximum y coordinates on a frame
    memory*/
    int yf [MAX_YSIZE]; /* y coordinates of grid lines on a
    frame memry*/}GRID_V;
typedef struct grid_h{/*a data structure for horizontal grid
line storage*/
    int angle/* an angle from the z-axis*/
    int x_min; /*a minimum value of X*/
    int x_max; /*a maximum value of X*/
    int xf[MAX_XSIZE]; /* x coordinates of grid lines on a
frame memory*/
        /*MAX XSIZE:a maximum X coordinates of a frame
```

-continued

```
    memory* /
        int ty[MAX_XSIZE]; /* y coordinates of grid lines on a
    frame memory*/}GRID_V;
    GRID_V Lv [GRIDMAX];
    GRID_H Lh [GRIDMAX];
```

Figure 15:
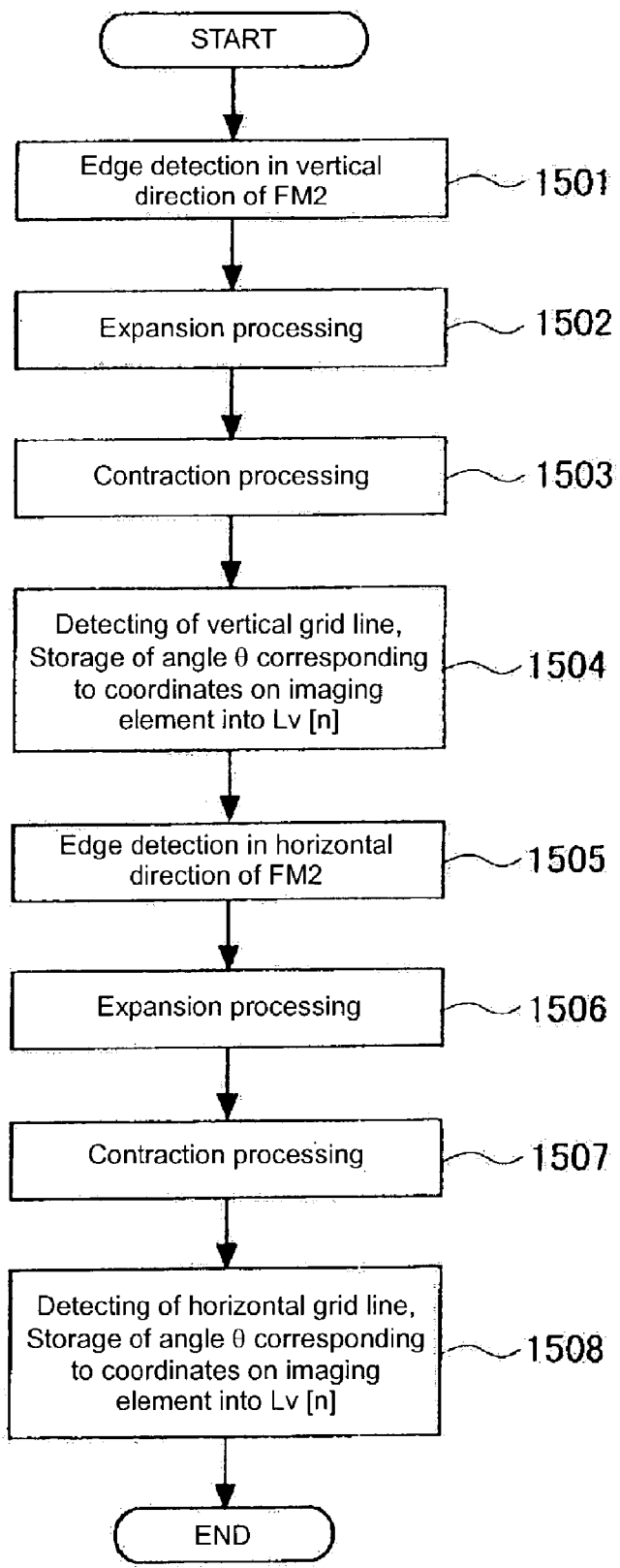
FIG. 15 is a flowchart of contents of data storage processing.

Detailed procedures of data storage processing described above are shown in a flowchart in FIG. 15. As an previous description, FIG. 16 shows an example of a data structure stored into the data storage processing (the example is a data structure in the case of imaging of a 6×7 combined image pattern projection).

In a data storage processing, at first, vertical components are detected in filtering to detect vertical grid lines (step 1501).

Next, edge lines are expanded and reduced to repair vertical grid lines which are cut during image processing (steps 1502 and 1503) to enhance vertical components.

Figure 16:
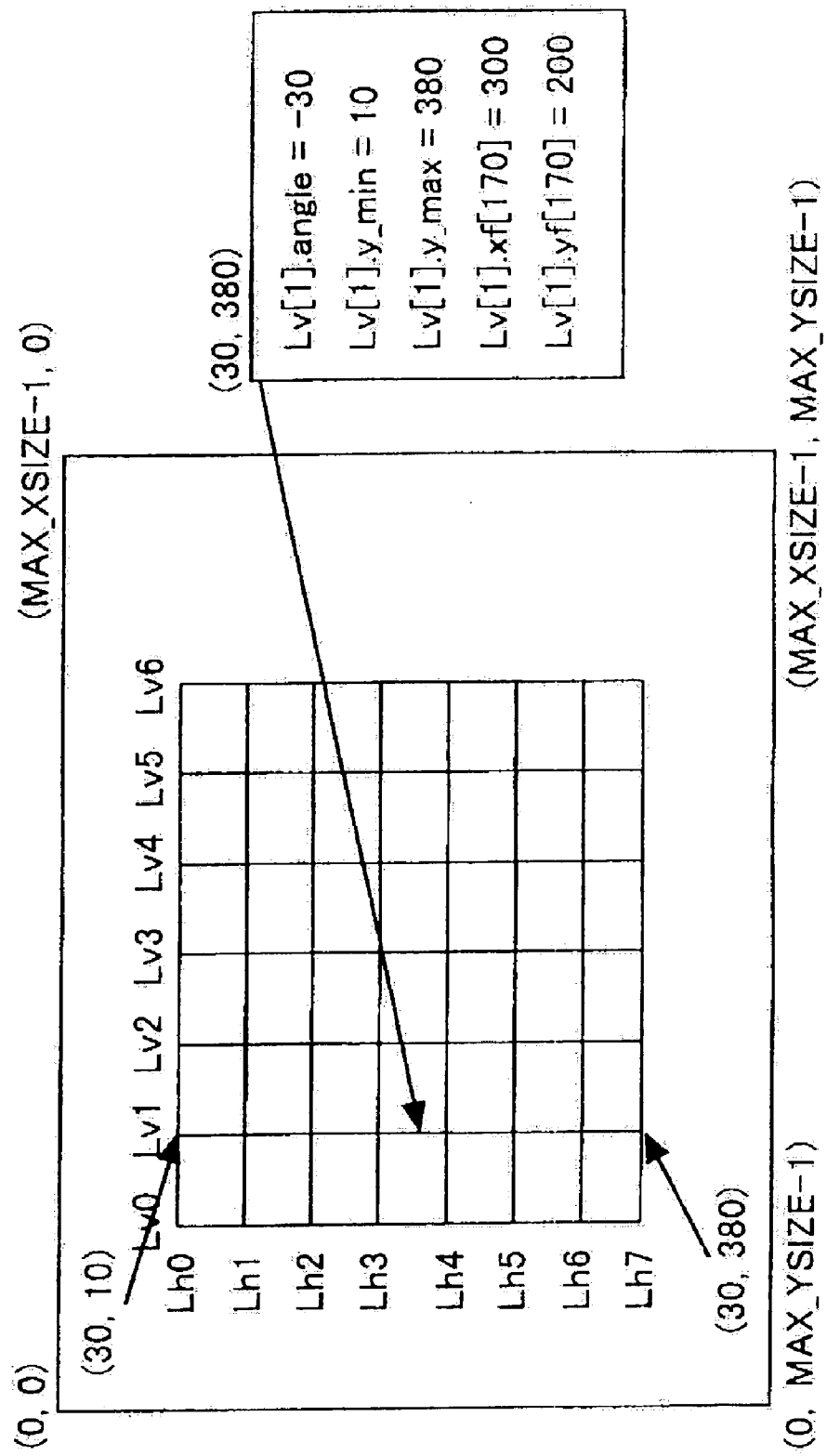
FIG. 16 is an illustration of an example of a data structure of a grid line.

Furthermore, coordinates on such image as shown in FIG. 16 (in the example, (0, 0) to (MAX_XSIZE−1, MAX_Y-SIZE−1) are scanned to detect vertical grid lines. At every detected gird line, the coordinates, the maximum value and the minimum value of the Y coordinates and the angle θx from the z-axis calculated by the previous calculation of the grid angles are stored into an appropriate data structure Lv [n] (step 1504). In the present example, the number 'n' shown in the data structure Lv [n] is incremented by +1 as it heads for the right from the left end of the grid lines which is set at '0'.

Similarly, horizontal components are detected in filtering to detect horizontal grid lines (step 1505).

For the next, edge lines are expanded and reduced to repair horizontal grid lines which are cut during the image processing (steps 1506 and 1507) to enhance vertical components.

Furthermore, coordinates on such image as shown in FIG. 16 (in the example, (0, 0) to (MAX_XSIZE−1, MAX_Y-SIZE−1) are scanned to detect horizontal grid lines. At every detected gird line, the coordinates, the maximum value and the minimum value of the X coordinates and the angle θx from the z-axis calculated by the previous calculation of the grid angles are stored into an appropriate data structure Lh [n] (step 1508). In the present example, the number 'h' shown in the data structure Lh [n] is incremented by +1 as it heads downward from the left end of the grid lines which is set at '0'.

The following description will explain the details on the setting mode for types of outputs. In the setting mode for types of outputs, the types of outputs deciding signal outputs OUT1 and OUT2 to the equipment 4 and the signal lamp 6 are selected when the incoming object M such as a human body or an obstacle enters into the monitoring space S.

As already shown in FIG. 7, setting for outputs can be performed at every voxel. In FIG. 7, though a 4×4×3 voxel is set, a split of a voxel can be also set freely without reference to the pattern light.

Figure 17A:
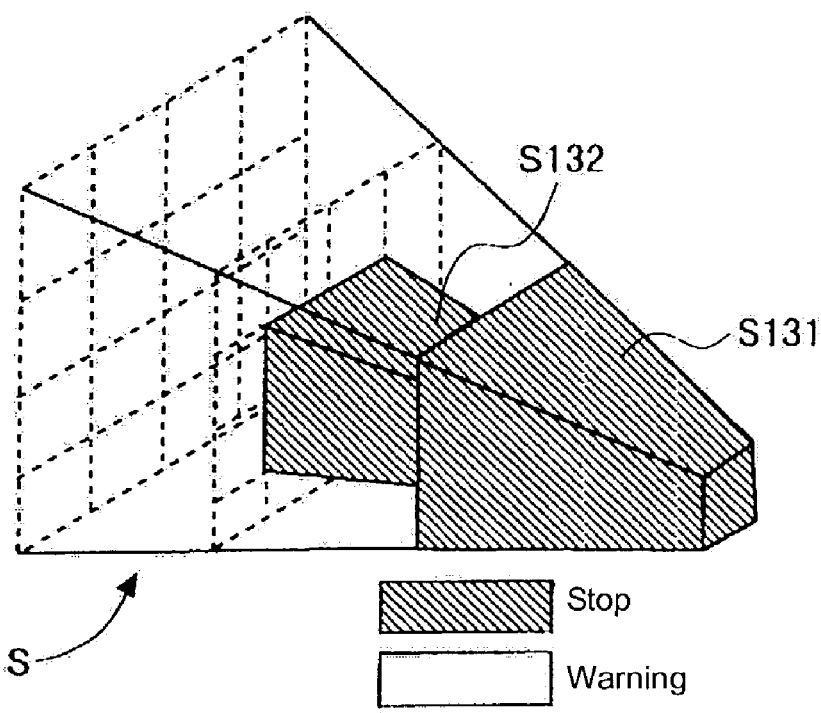
FIGS. 17A and 17B are an illustration of an example of types of outputs setting to the space to be monitored.
Figure 17B:
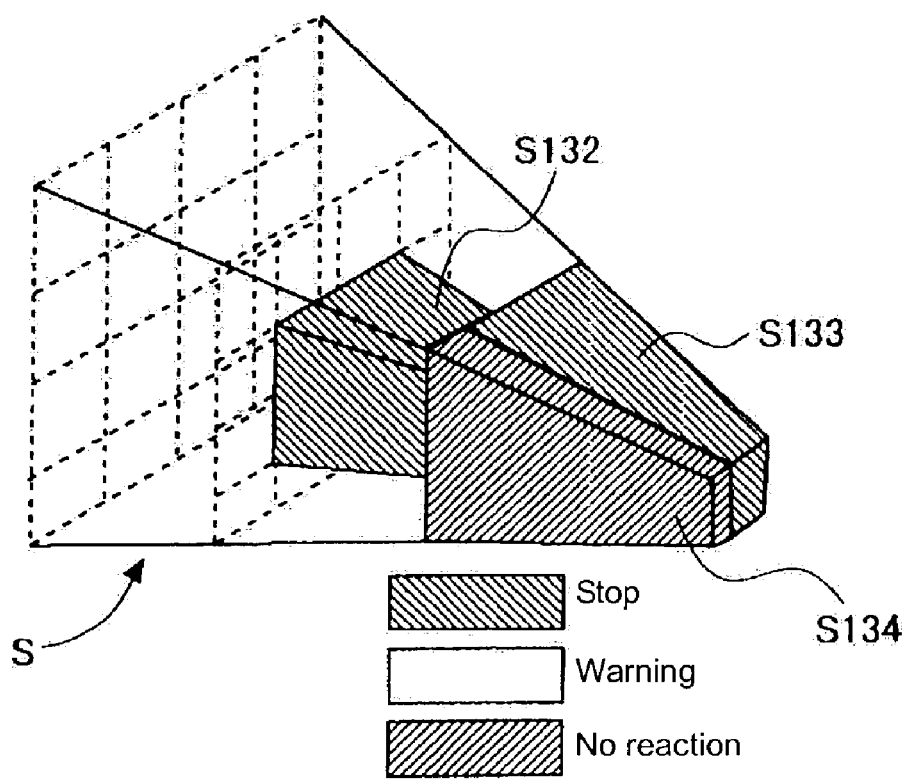

An example of the types of outputs setting for the monitoring space S is shown in FIG. 17. In an example of the setting shown in FIG. 17A, hatched areas (voxels S131 and S132) are set to 'stop operation'. If the human or the obstacle enters into the areas, the signal lamp 6 comes on in a red and the equipment 4 comes to a stop of an operation. Areas in white except for hatched areas are set to 'warning', if the object M enters into the areas, the lamp 6 comes on in a yellow to operate the equipment 4 without interruption.

There are occasions when an operator wants to enter into the monitoring space S to adjust the equipment, in this situation, it is dangerous for the operator to be pushed from the rear by an incoming of another operator (or an obstacle) during the adjustment. In such case, it is possible for the operator to be in safety and to increase productivity with the setting of the type of output to 'no reaction' in the area needed for operations. In an example shown in FIG. 17B, when the human or the obstacle enters into areas indicated by voxels S132 and S133, the signal lamp 6 comes on in a red and the equipment 4 subject to stop its operation, but an area indicated by a voxel S134 is set to 'no reaction', so that if the human or the object enters into the voxel S134, the output is not changed.

Figure 18:
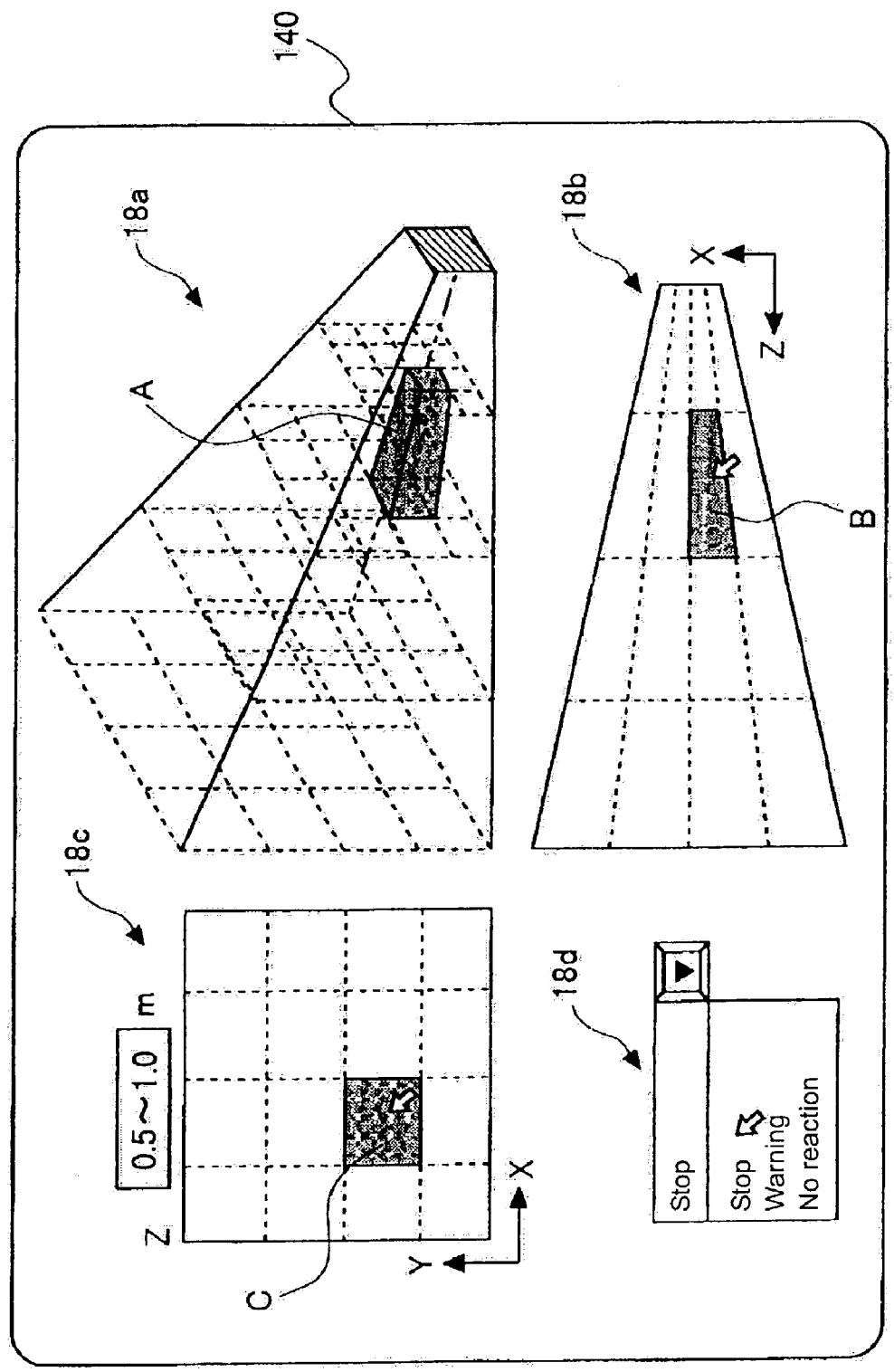
FIG. 18 is an illustration of an example of an interface (a screen of a personal computer) to set the space to be monitored.

An example of an interface to set the monitoring space S is shown in FIG. 18. In the example, the interface is provided with software on a personal computer. On a display 140 of the computer, a projection for a bird's eye view 18a allowing a bird's eye view by splitting the monitoring space S into voxels, a projection for X-Z selection 18b to select a voxel by watching the monitoring space S from a direct side, a projection for Y-X selection 18c to specify a voxel by watching the monitoring space S from a right front and a projection for setting type of output 18d to set types of outputs by voxel are displayed simultaneously.

User setting procedures by using the interface are described as follows.

1. To specify an X-Z area to which a voxel desired to be set belongs on the projection for X-Z selection 18b by a cursor (reference symbol B in FIG. 18.

2. To specify an X-Y area to which a voxel desired to be set belongs on the projection for X-Y selection 18c so as to complete a specifying of a voxel (reference symbol C in FIG. 18).

3. To select a type of output from the projection for setting types of outputs 18d for the specified voxel.

When completing the selection of the types of outputs, a corresponded voxel is indicated with a color at the projection for bird's eye view 18a (a reference symbol A in FIG. 18).

4. After that, procedures 1 to 3 are repeated to perform necessary setting for type of output to any voxel.

Figure 19A:
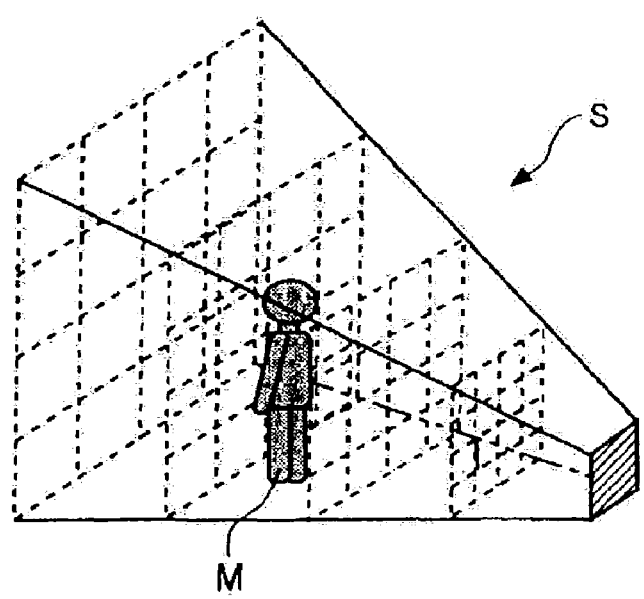
FIGS. 19A and 19B are an illustration of contents of a voxel automatic specifying (teaching) associated with the types of outputs setting.
Figure 19B:
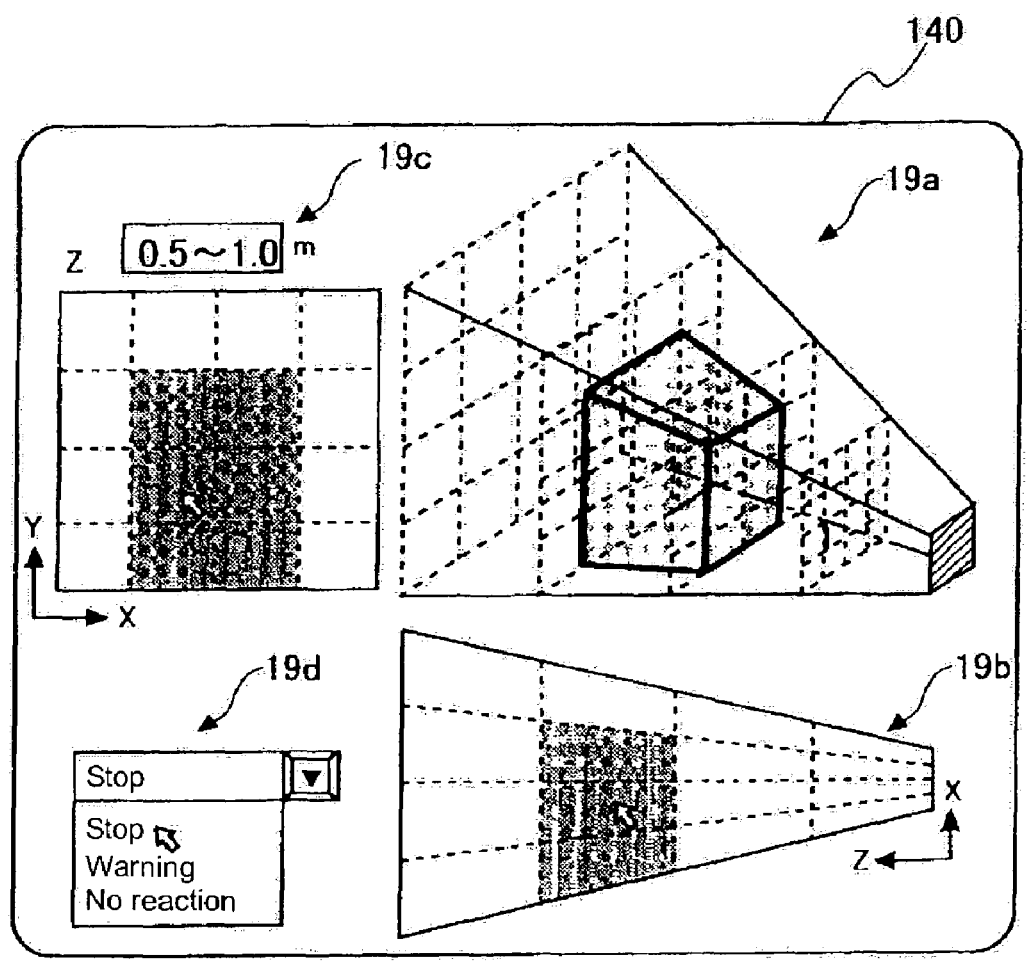

Another setting method for type of output (a voxel teaching) is shown in FIG. 19. In this example, the object M desired to be detected such as a human or an obstacle was placed at any position in the monitoring space S in advance. In this situation, if a predetermined setting instruction is inputted, a voxel to which the object M belongs is selected, then, a desired type of output for the voxel is set by an image for setting a type of output.

Figure 20:
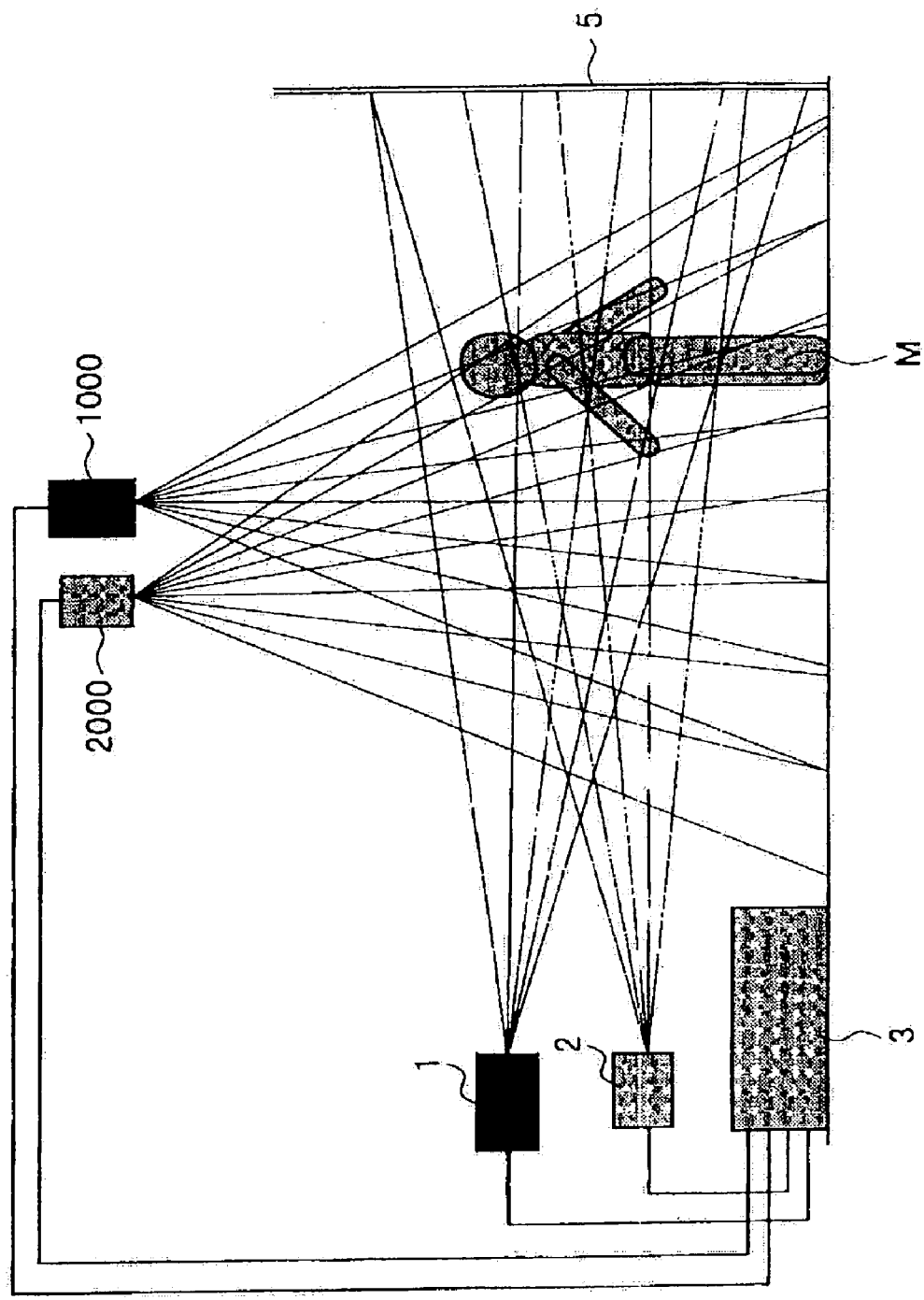
FIG. 20 is a schematic illustration of an example using simultaneously two pair of the light source and the camera unit.

In FIG. 20, another embodiment of the present invention is illustrated. In the foregoing embodiment, only one set of light source unit is used, so that it is impossible for an operator while operating in a predetermined area in the monitoring space S to monitor simultaneously the rear in which the pattern light irradiation is blocked. In the embodiment illustrated in FIG. 20, another one pair of units (a light source unit 1000 and a camera unit 2000) which is the same as that of the pair of the light source unit 1 and the camera unit 2 shown in the foregoing embodiment is used to irradiate an image respectively from different directions (in the embodiment, from a front and a slanting upper directions of the screen 5), so that a blind spot is compensated and further operator safety is assured.

For the next, a content of operations in the monitoring mode, which is a main function of the three-dimensional monitoring apparatus of the present embodiment, is described as follows. Setting the monitoring mode to the setting control part 30 through a user's operation performs the monitoring mode.

The three-dimensional monitoring apparatus 100 performs a self-diagnosis before starting the monitoring. At first, a method for self-diagnosis adapted to the present embodiment is described.

During the self-diagnosis, each unit operates as follows.

The control part 31 controls the light source unit 1 as is the case of the calibration mode and scans the pattern light in the monitoring space S.

The camera unit control part monitors the control signal from the control part 31 as is the case of the calibration mode and controls the shutter 21*b* of the camera unit 2 to acquire image data of one cycle of a character 8. When capturing an image from the camera unit 2, the frame memory FM1 for reading images should be completely cleared in advance.

The self-diagnosis part 34 comprises image data for diagnosis captured from the camera unit 2 with data of the reference image stored into the frame memory FM2, if the same image pattern is recognized in the same area range, it is decided that the self-diagnosis part 34 gives its OK to proceed to the monitoring. If the image pattern is not recognized or if an existence area of the captured image pattern is wider or narrower than that of the data of the reference image, it is decided that the self-diagnosis part 34 gives its NG to perform the monitoring.

When intending to execute the self-diagnosis, the object M has already entered into the monitoring space S sometimes, in this case, if an irregular spot in an image pattern is found within an outer frame (within an allowable area range) of a pattern of the reference image, it is considered that the irregular spot is caused by an entering of the incoming object M and the self-diagnosis part 34 gives its OK to proceed to the monitoring.

When the self-diagnosis part 34 has given its NG, the decision part 35 outputs the signal output OUT1 of 'stop' to stop the equipment 4 immediately.

Figure 21:
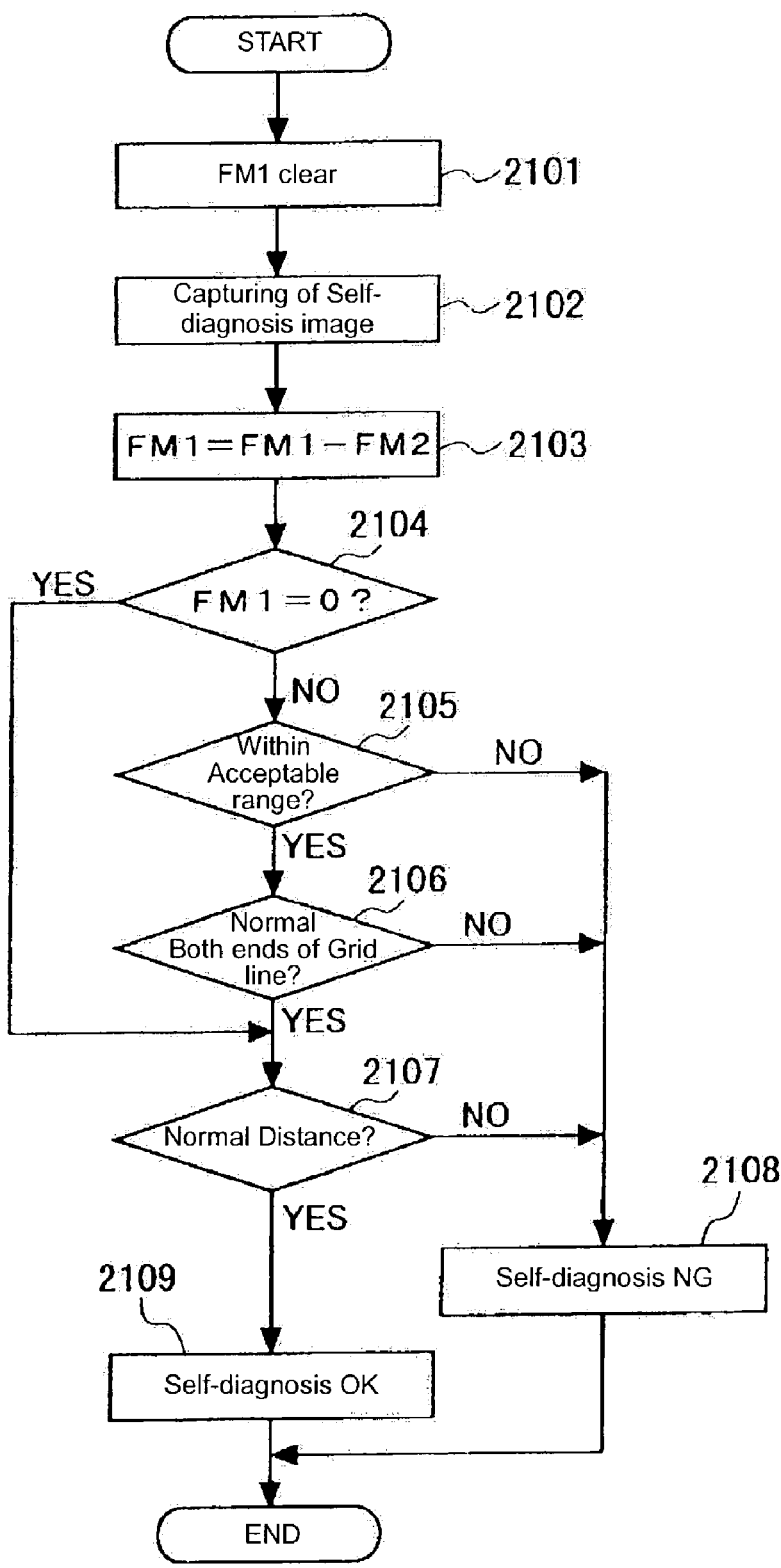
FIG. 21 is a flowchart of contents of self-diagnosis processing.

Referring to the flowchart in FIG. 21 for the detailed contents of operations of the self-diagnosis, the embodiment indicated by the flowchart shows the case when the pattern projection is projected on the screen 5 as already shown in FIG. 16.

When starting the self-diagnosis processing, at first, the frame memory FM1 to capture images is cleared (step 2101). The projection pattern of one cycle of a character 8 is imaged as is the case of the calibration mode, and a self-diagnosis image is stored into the frame memory FM1 (step 2102).

If there is a difference between the reference image pre-stored in the frame memory FM2 and the self-diagnosis image, it may be considered that the difference is caused by irregular occurrences of groups of light-irradiation, light receptive, scanning, or an occurrence of an incoming of the incoming object M. In the embodiment, then the difference between the reference image and the self-diagnosis image is extracted (step 2103).

If there is no difference between the reference image and the self-diagnosis image (FM1=FM1−FM2, YES, in step 2104), it is considered that the monitoring apparatus 100 works normally (go to a step 2107).

If there is the difference between the reference image and the self-diagnosis image (NO, in step 2104), it is decided whether coordinates of a part causing the difference between the reference image and the self-diagnosis image exist outside of an outer grid line of the reference image (outside of the range corresponding to Lh[0] to Lh[7], or Lv[0] to Lv[6] shown in FIG. 16) or not (whether the coordinates exist within an allowable range or not). If there are no coordinates within the allowable range (NO, in step 2105), there is a possibility that over scanning has occurred, so that the self-diagnosis part 34 gives its NG (step 2108) and the processing is ended temporarily.

If there is the difference within the acceptance range (YES, in step 2105) then the right end and the left end of the vertical grid line (Lv[0] and Lv[6]) are searched, and if the both ends are searched normally (YES, in step 2106), it is considered that a control output from the light source unit control part 31 can be matched with the image pattern captured by the control output. Accordingly, in this case, it is considered that the difference between the both images is caused by the incoming of the incoming object M (YES, in step 2107), but if the both ends are not searched normally (NO, in step 2106), it is considered that there is some irregularity, the self-diagnosis part 34 gives its NG and the signal output (OUT1) to stop the equipment 4 is outputted from the decision part 35 (step 2108). It is possible for the normality of both ends Lv[0] and Lv[6] to be shown by conforming the absence of the difference between the frame memories FM1 and FM2 on the coordinates stored into the data structure.

The distance data L up to the screen 5 acquired in the calibration mode is compared with the distance to the Lh[0] (the top end of the horizontal grid line) acquired by the principle of triangulation techniques. If the both distances are equal (including the case that the difference between the both distances is within an allowable error range) (YES, in step 2107), it is considered that calculation is also completed normally and the self-diagnosis gives the OK grade (YES in step 2107, step 2109). If there is difference between the both distances (NO, in step 2107), it is considered that something unusual has occurred and the self-diagnosis part 34 should give NG to output the signal to stop the equipment 4 (step 2108). A manner to calculate the distance up to the Lh[0] will be described later.

If the self-diagnosis part 34 gives OK, the monitoring is performed continuously. During the monitoring, each unit works as follows.

The light source unit control part 31 controls the light source unit 1 to scan the pattern light in the monitoring space S as in the case of the calibration mode.

The camera unit control part 32 monitors the control signal from the light source unit control part 31 as in the case of the calibration mode and controls the shutter 21*b* of the camera unit 2 to acquire the image data of one cycle of a character 8.

Figure 22A:
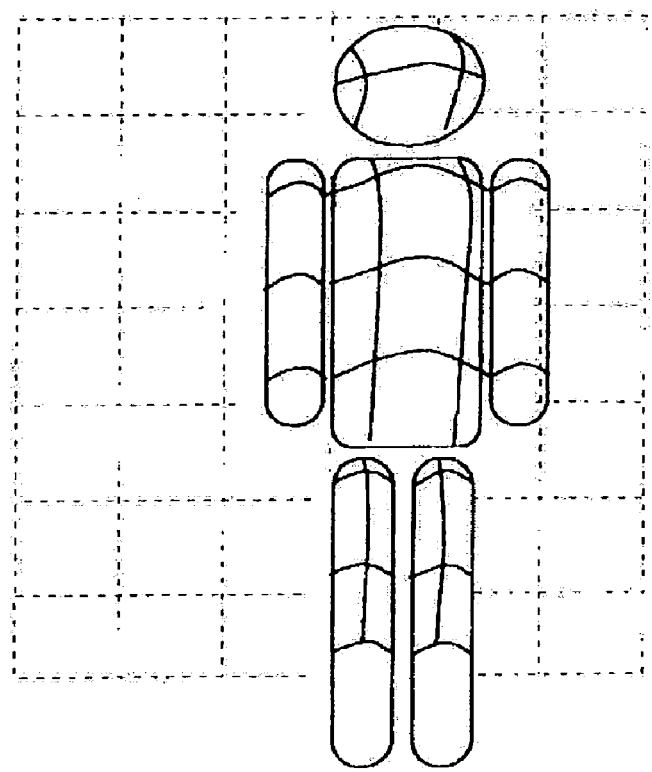
FIGS. 22A and 22B are the first illustration of contents of image processing by an image processing measuring part.
Figure 22B:
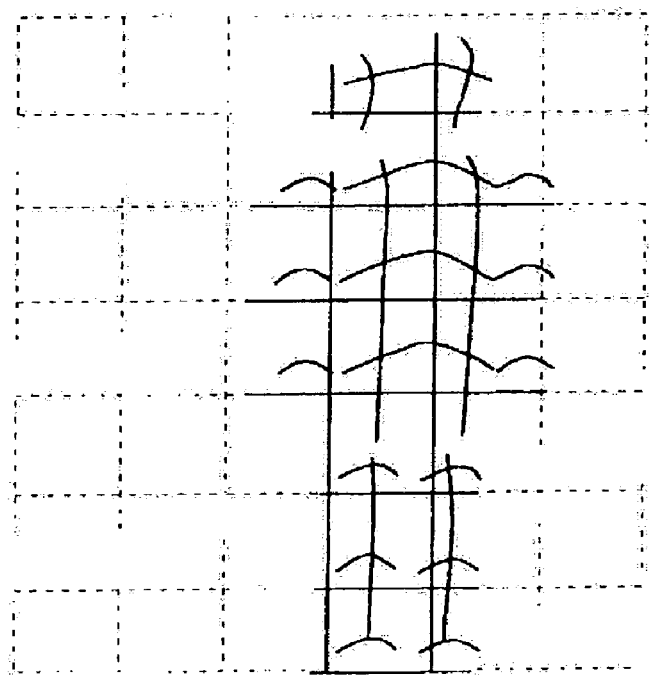

The image processing measuring part 33 calculates a difference between capture image shown in FIG. 22A (the camera unit 2 has a filter corresponding to a wavelength of the light source element, so that an outline of a human body is not projected actually as shown in FIG. 22) and the reference image stored into the frame memory FM2 to store a difference image shown in FIG. 22B into the frame memory FM1.

For the next, a distance map z (x, y) to the detected objects M is calculated by using the original position of the grid line and a difference from the original position.

Figure 23A:
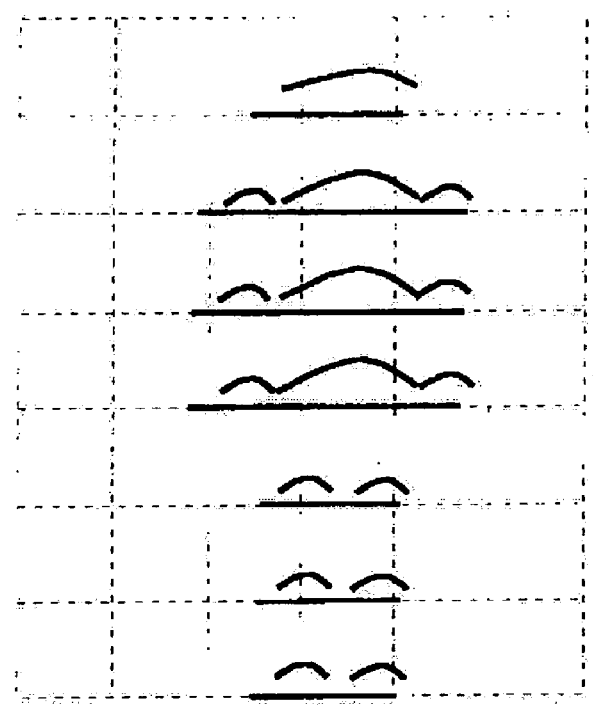
FIGS. 23A and 23B are the second illustration of contents of image processing by an image processing measuring part.
Figure 23B:
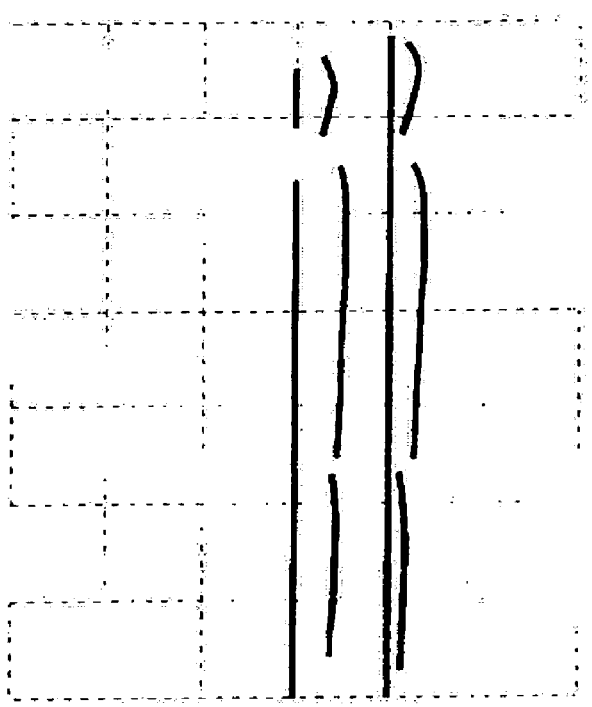

For the sake of clarity, the difference image stored into the frame memory FM1 is split to X-axis components and Y-axis components to show in FIG. 23A and FIG. 23B.

As shown in FIG. 23, in the difference image, each pixel value of parts (coordinates) which are not entered by the objects become 0 values. If positions of the grid lines are moved by incoming of the incoming objects M, the pixel values of the parts of the original grid lines becomes minus values and coordinates of destination positions where the grid lines have moved become plus values.

Coordinates of each grid line are already stored into the data construction (Lh[ ] and Lv[ ]) when generating the reference image (see FIG. 15 and FIG. 16), so that moving destinations of each grid line are searched along the horizontal grid lines and vertical grid lines based on the data construction. The situation is shown in schematic form in FIG. 24

Figure 24A:
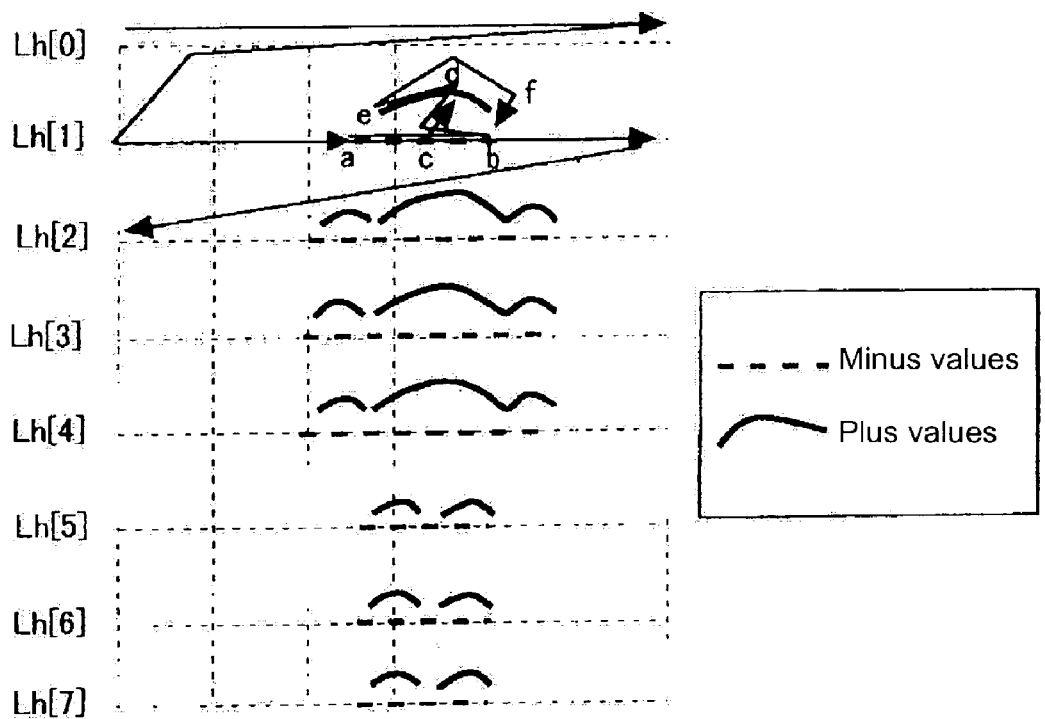
FIGS. 24A and 24B are the third illustration of contents of image processing by an image processing measuring part.

As shown in FIG. 24A, in the assumption that a line from a point a to a point b indicates the original grid line, the grid line after moving is searched from a middle point c toward a slanting 45° direction. The search toward the slanting 45° direction is decided based on the position relation between the light source unit 1 and the camera unit 2 as already shown in FIG. 8.

If the moved grid line is found by searching (a point d in FIG. 24), whole of coordinates of moved grid lines (e to d to f) is acquired.

Angles of the grid lines to the light axis Z of the light source element 11 are already known (already stored into the 'angle' of the data structure Lh[ ] and Lv[ ]), so that the distance map z (x, y) can be calculated by the principle of triangulation techniques with calculating angles between grid lines which is off from a light axis observed on the CCD.

Figure 25:
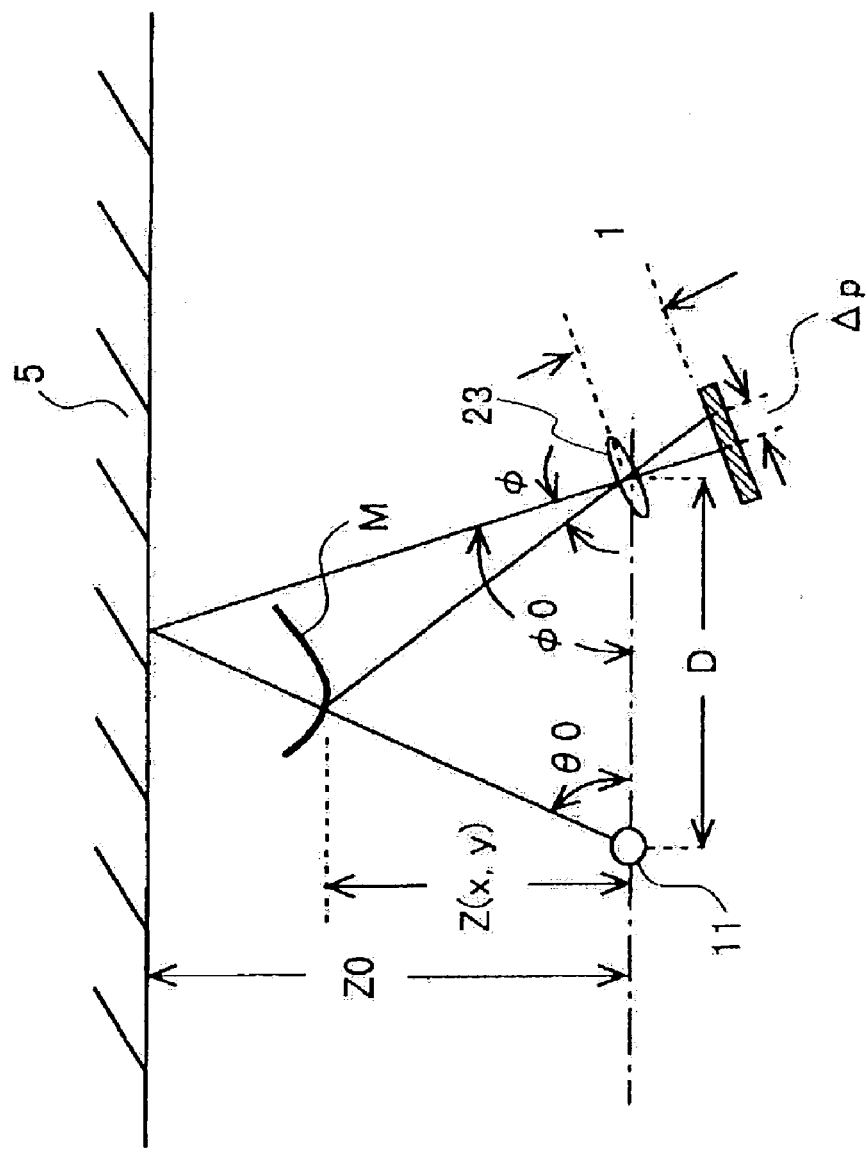
FIG. 25 is a schematic illustration of distance-measurement principle based on the triangulation techniques adapted to the present invention.

The principle of calculation by triangulation techniques applying to the present embodiment is shown in FIG. 25. Now assuming that the number of pixels of the CCD is 640×480, the pitch of the pixel of the CCD is ccd_p, the light axis of the CCD passes (319, 239) and a focal length of the camera unit 2 is '1'.

Assuming that the coordinates of the grid line of the monitoring image (on the CCD) are (x1, y1), the actual deviation ($\Delta dy$) from the light axis on the CCD is expressed by an equation as follows.

$$\Delta dy = ccd\_p * (y1 - 239) \quad \text{[Equation 2]}$$

The fact that the focal distance of the camera unit 2 is '1' and the expression with $\Delta dy$ of a moving amount of the grid line is expressed in an angle as follows.

$$\phi' = \tan^{-1}(\Delta dy/1) \quad \text{[Equation 3]}$$

Furthermore, the distance g (x, y) up to the deviated grid line can be calculated by using the relation between the angle from the light source element 11 of the grid line which has not moved yet and already stored into the data structure (Lh[n], angle) and the angle $\phi 0$ which a lens plane 23 of the camera forms with the light source element 11. (The following equation 4 is a general equation of the triangulation techniques.)

$$g(x, y) = L * \tan \theta * \tan \phi / (\tan \theta + \tan \phi) \quad \text{[Equation 4]}$$

where, $\phi = \phi 0 + \phi'$

With the use of the equation 4, the whole of the distance g(x, y) corresponding to each moved grid line are calculated. For ensuring safety, in calculable coordinates (crossing points of grid lines) in both directions of X-axis and Y-axis, a smaller distance is used for the calculation.

According to the present embodiment, the camera unit 2 is placed at the position at slanting 45° with respect to the light source unit 1, so that whole of distance z (x, y) can be calculated with one time imaging by using the both parallax of the X-axis and the Y-axis. That is one of merits in using a laser pattern shaped like a grid.

Figure 26:
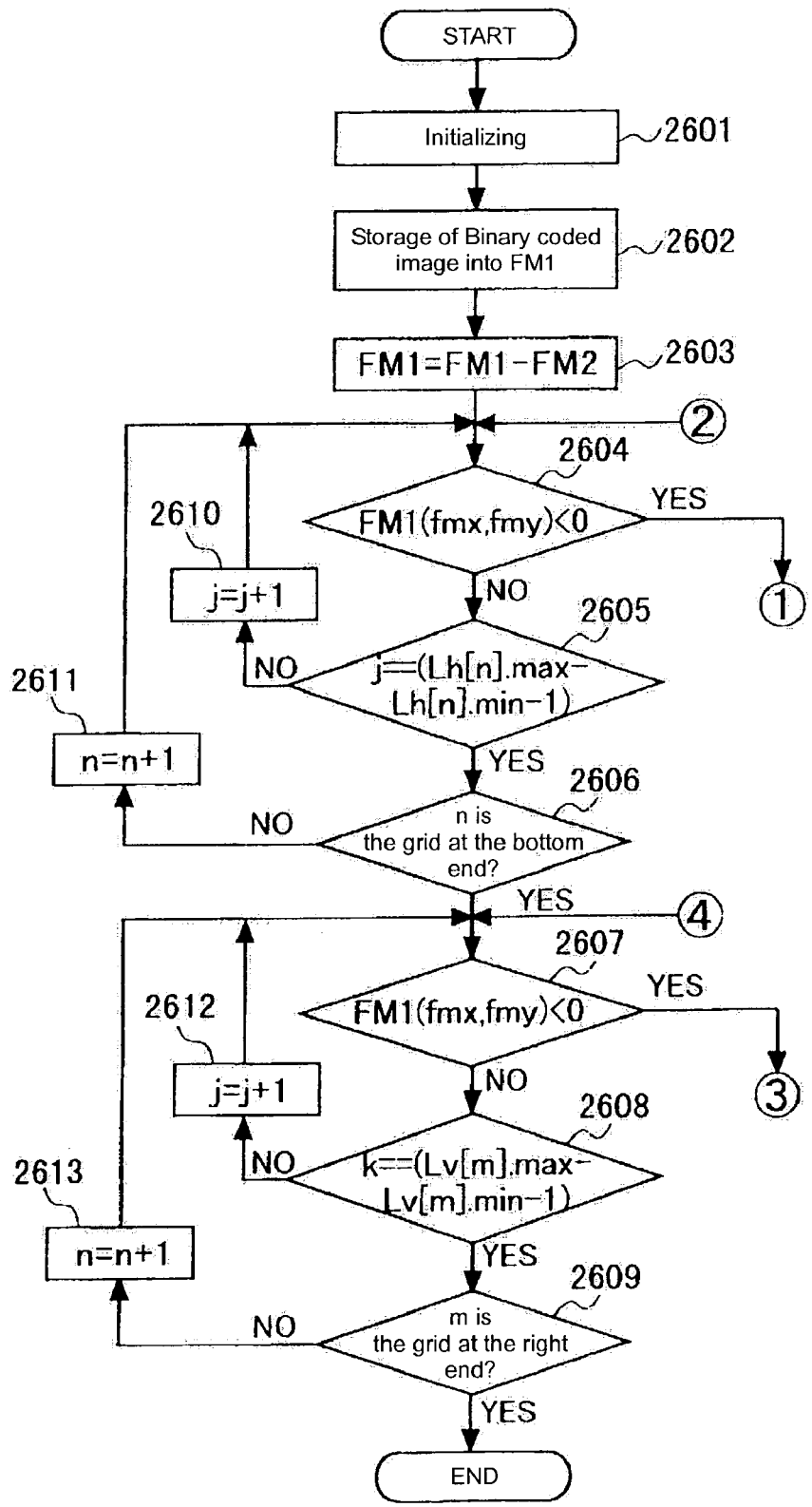
FIG. 26 is the first flowchart of contents of processing associated with distance-measurement.
Figure 27:
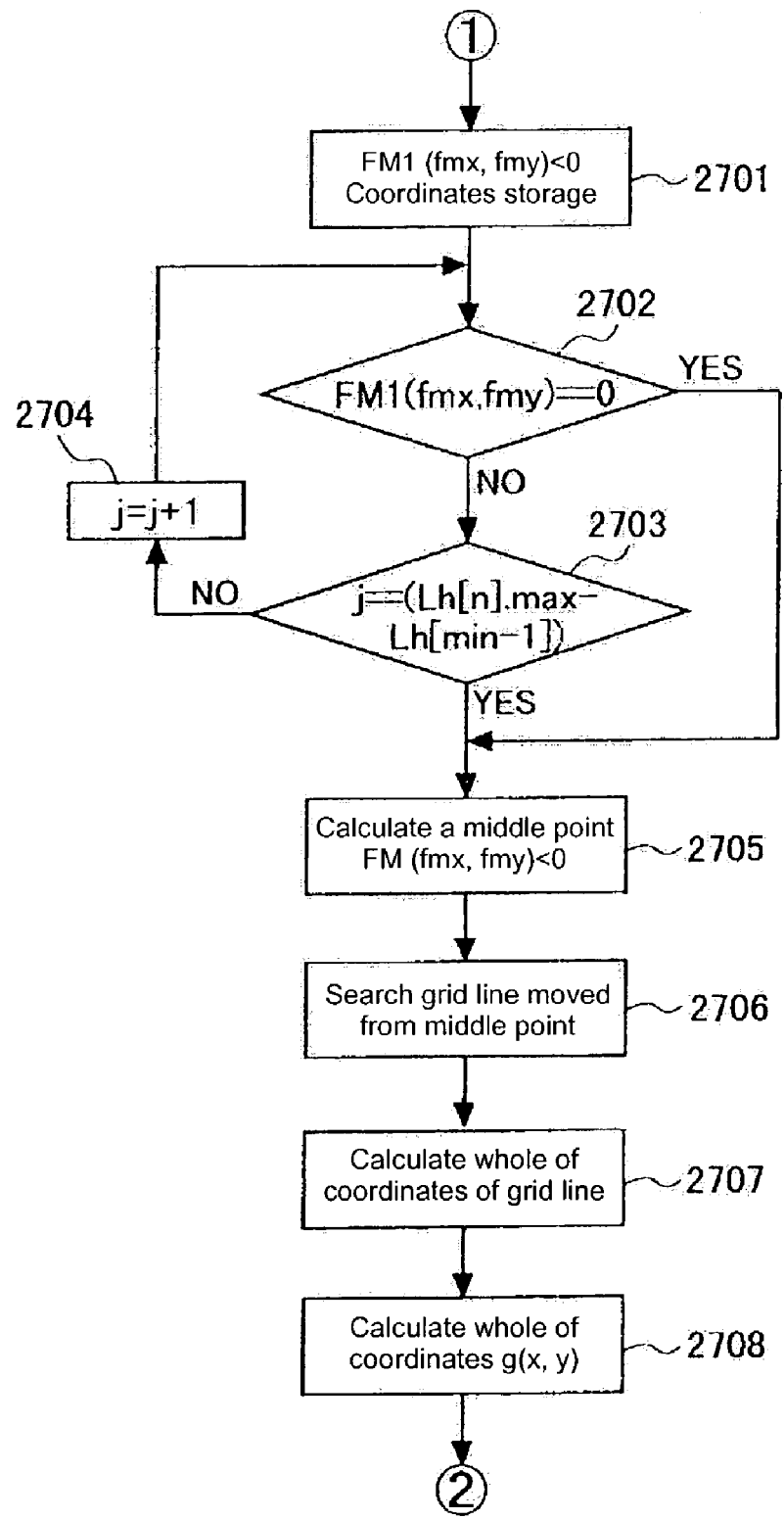
FIG. 27 is the second flowchart of contents of processing associated with distance-measurement.
Figure 28:
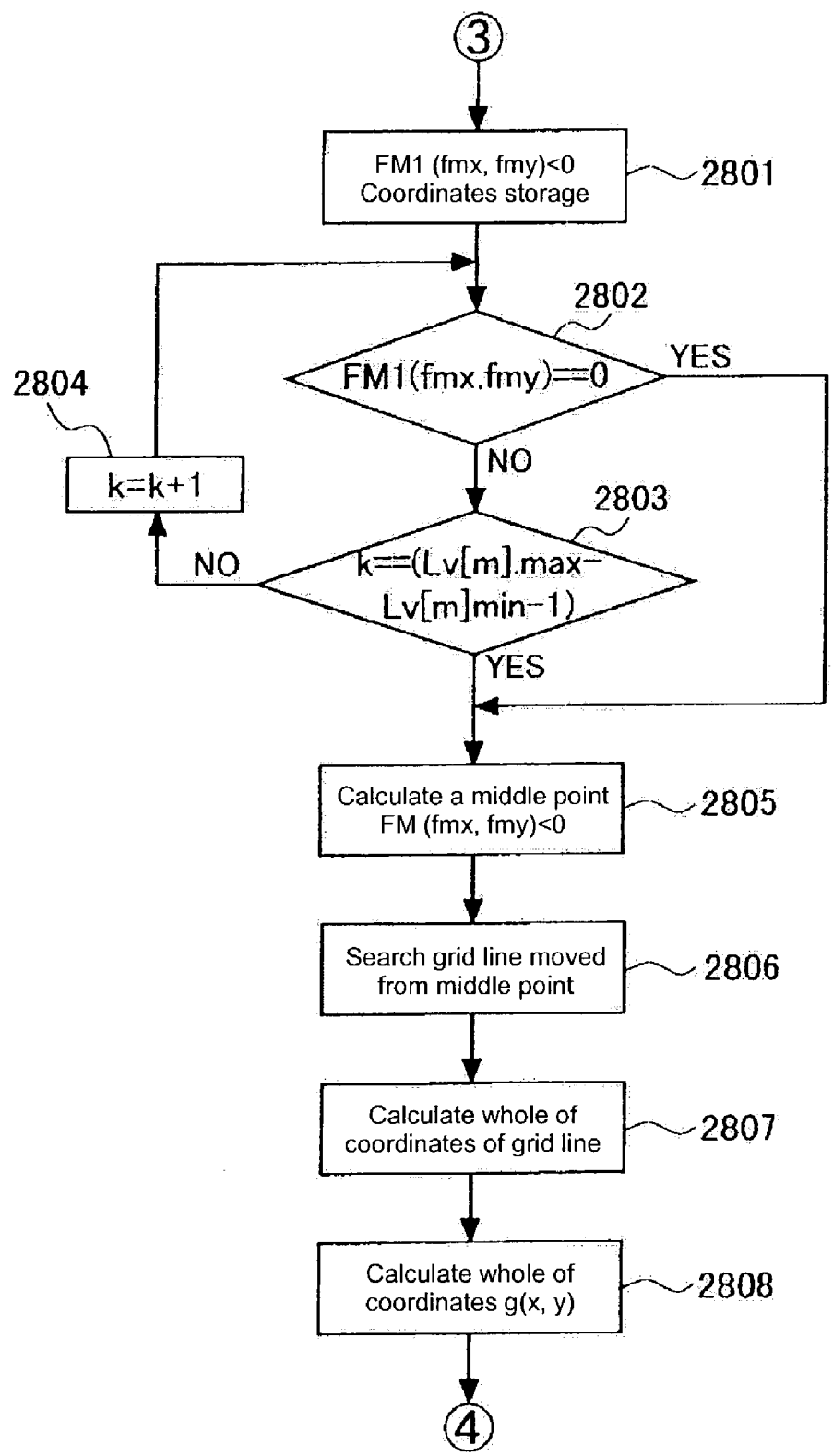
FIG. 28 is the third flowchart of contents of processing associated with distance-measurement.

The contents of processing regarding to the foregoing distance measurement by the image processing measuring part 33 are shown in flowcharts in FIG. 26-FIG. 28.

In the processing of distance calculation shown in the flowchart in FIG. 26, at first, initializing is performed (for every x and y, g (x, y)=0, m=0, n=0 j=0 and k=0) (step 2601).

Monitoring images encoded in binary form are stored into the frame memory FM1 (step 2602).

The reference image between the stored monitoring image and the reference image is extracted to store into the frame memory FM1. Accordingly, values of parts of moved grid lines become + values, values of parts of original grid lines become minus values and values of unchanged parts become plus or minus 0 values (step 2603).

A point at FM (xm, ym)<0 (point 'a' in FIG. 24A) is retrieved along the coordinates of gird lines (xm=Lh[n].xf [j], ym=Lh[n].yf[j]) stored into the data structure Lh[n] of the horizontal grid lines (step 2604). When the point 'a' is searched, processing is moved to a routine for distance measurement (step 2701-step 2708, in FIG. 27). The search processed in the step 2604 is performed to a whole of horizontal grid line (No, in step 2604, No, in step 2605 and step 2610). Where, 'j' is 0 to Lh[n].max-Lh[n].min−1.

It is checked whether whole of search for horizontal grid lines is completed or not. When the search is completed, next, a search for vertical grid lines is performed (step 2607-2609).

A point at FM (xm, ym)<0 is searched along the coordinates of gird lines (xm=Lv[n].xf[k], ym=Lv[n].yf[k]) stored into the data structure Lv[m] of the vertical grid line (step 2607). When the point 'a' is searched, processing is moved to a routine for distance measurement (step 2801-step 2808, in FIG. 28). The search processed in the step 2607 is performed to whole of vertical grid line (No, in step 2607, No, in step 2608 and step 2610). Where, 'k' is 0 to Lv[m].max-Lv[m].min−1.

It is checked whether the search for vertical grid lines is completed or not (step 2609). This check is performed to whole of vertical grid lines (NO, in step 2609, step 2613), when the search is completed the processing is completed contemporarily.

In a processing of distance calculation (a routine for distance measurement along with movements of grid lines in the horizontal direction), at first, coordinates which have become FM (fmx,fmy)<0 shown at point 'a' in FIG. 24A are stored as (fmx_s,fmy_s)(step 2701).

In a step 2702, a point whose coordinates FM (fmx, fmy) have become 0 again (point 'b' in FIG. 24A) is searched. The search is performed up to the end of the grid line (NO, in step 2703, step 2704 and NO, in step 2702).

In a step 2705, a middle point (fmx_s, fmy_s) (point 'c' in FIG. 24A) of a section in which a position of a grid line is moved due to an incoming of an object is calculated from a present point (fmx, fmy).

In a step 2706, the grid line moved from the middle point (fmx_s, fmy_s) due to the incoming of the object is searched. The search is performed for a point of FM1(x, y)>0 (a point 'd' in FIG. 24A) in a slanting 45° direction from the middle point.

Figure 24B:
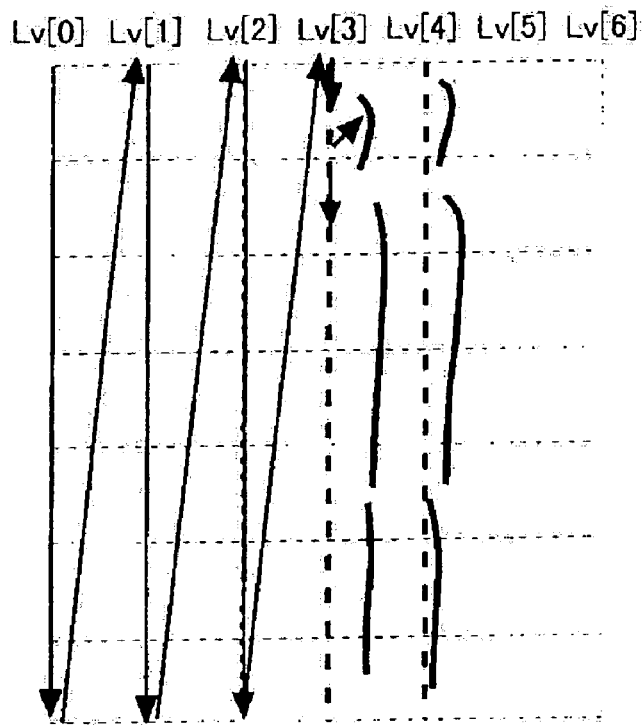

In a step 2707, the search is performed in a right and left directions of the moved grid line to obtain the whole coordinates of the grid line (coordinates on the frame memory FM1 shown as d to e to f at (a) in FIG. 24).

In a step 2808, g(x, y) of whole coordinates is calculated by the principle of triangulation techniques.

In distance processing (a routine for distance measurement along with movements of grid lines in the vertical direction), at first, coordinates which have become FM(fmx, fmy)<0 are stored as coordinates (fmx_s, fmy_s) (step 2801).

In a step 2802, a point that the coordinate FM1 (fmx, fmy) become 0 again is searched. The search is performed up to the end of the grid line (NO, in step 2803, step 2804 and NO, in step 2802).

In a step 2805, a middle point (fmx_s, fmy_s) of a section in which a position of a grid line is moved due to the incoming of the object is calculated from a present point (fmx, fmy).

In a step 2806, the grid line moved from the middle point due to the incoming of the object is searched. The search is performed for a point of FM1(x, y)>0 in a slanting 45° direction from the middle point.

In a step 2807, moved grid line is searched in the right and left directions and a whole of coordinates of the grid line is acquired.

In a step 2808, coordinates g (x, y) regarding to a whole of coordinate are calculated based on the principle of triangulation techniques. Where, the same method for calculation as the foregoing method is applied to the vertical grid lines. But, as for points (crossing points of the vertical and horizontal grid lines) whose coordinates g(x, y) have already calculated, if values which have just calculated this time are greater than the values which have calculated previously, the values calculated previously (smaller values) are given priority.

The decision part 35 checks whether the position of the coordinates z (x, y) measured by the foregoing image processing measuring part 33 has entered into a specified area (a specified voxel) specified in the setting mode for types of outputs or not.

If the coordinates z(x, y) exist in the voxel which is set to 'stop', the signal to stop the equipment is outputted immediately.

When the calculated coordinates z(x, y) is not in the voxel which is set to 'stop' but in the voxel which is set to 'warning', a warning output is outputted. In this processing, the voxel, which is set to 'no reaction', is not checked.

Next, the following is an explanation of an incoming prediction function by means of the decision part 35.

The decision part 35, in the monitoring mode, collects points (point coordinates of surfaces of the incoming object) with coordinates satisfying the following equation: z(x, y)<L (distance data L) and calculates its gravity coordinates gt(xt, yt, zt) to store, then, acquires respective moving directions and moving speeds in the X, Y and Z-axis of the incoming object. Calculation equations of moving speed v are as follows.

$vx=\delta gt/\delta x=(x[t-1]-xt)$/measuring interval $vy=\delta gt/\delta y=(y[t-1]-yxt)$/measuring interval $vz=\delta gt/\delta z=(z[t-1]-zt)$/measuring interval [Equation 5]

Figure 29A:
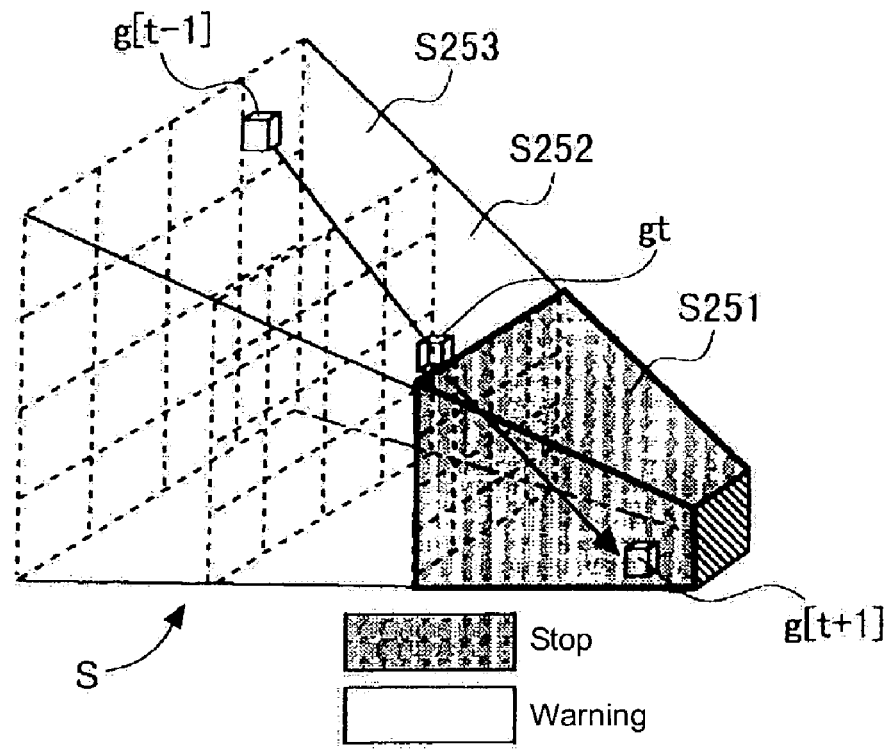
FIGS. 29A and 29B are an illustration of contents of processing of an arrival range prediction of an object in the space to be monitored.
Figure 29B:
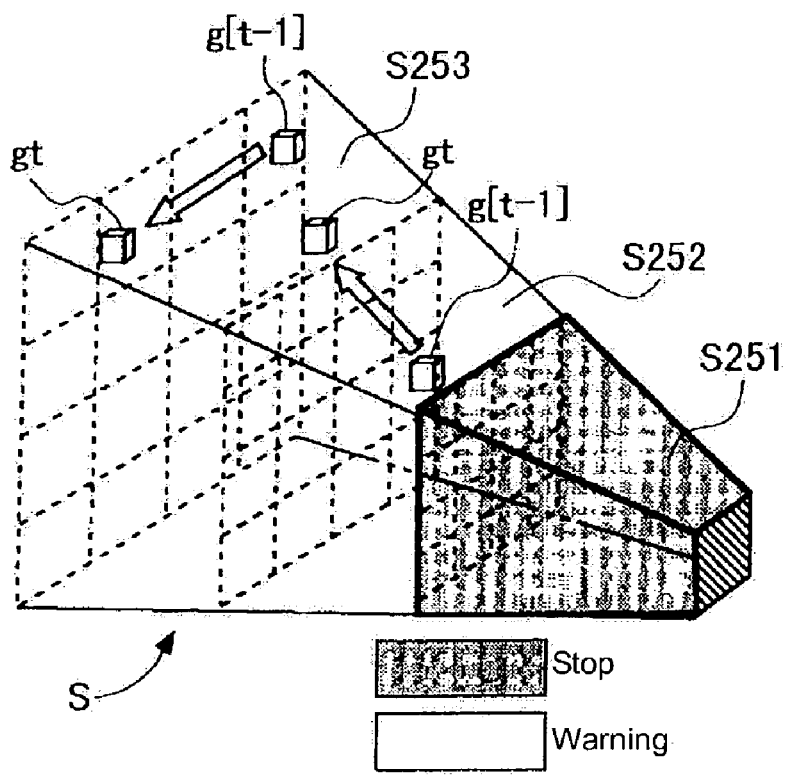

The decision part 35 calculates a predictive arrival position (coordinates) g [t+1] in the next measurement from the calculated moving speed v and the present gravity position gt. As shown in FIG. 29A, for example, when the incoming object moved in the monitoring space S and the calculated gravity position gt changes as 'g [t−1] to gt', the incoming object M will be predicted to move to the back area S251 as far as it will go which is set to 'stop'. In this situation, for example, it is considered that it is impossible for a case to secure safety of an operator even stopping the equipment at the next measurement timing. In such case, the decision part 35 calculates the predictive arrival position g [t+1], and if the position g [t+1] exists in the area set to 'stop', outputs the signal to stop the equipment at the point in time.

If the gravity position gt moves away toward the z-axis in the monitoring space S, or does not move (pass) toward the z-axis, the decision part 35 considers that a dangerous factor is so low to clear a warning situation or keep the present situation.

If there is a plurality of incoming objects M simultaneously in the monitoring space S, it is preferable for the decision part 35 to split the monitoring space S into applicable state of voxels and individually manage at every voxel the gravity coordinates of coordinates z (x, y) belonging to each voxel, and calculate the moving directions and moving speeds to predict a risk.

The decision part 35 uses the gravity positions, it is acceptable to use a point with the smallest value (the closest to the camera) for the decision.

Figure 30:
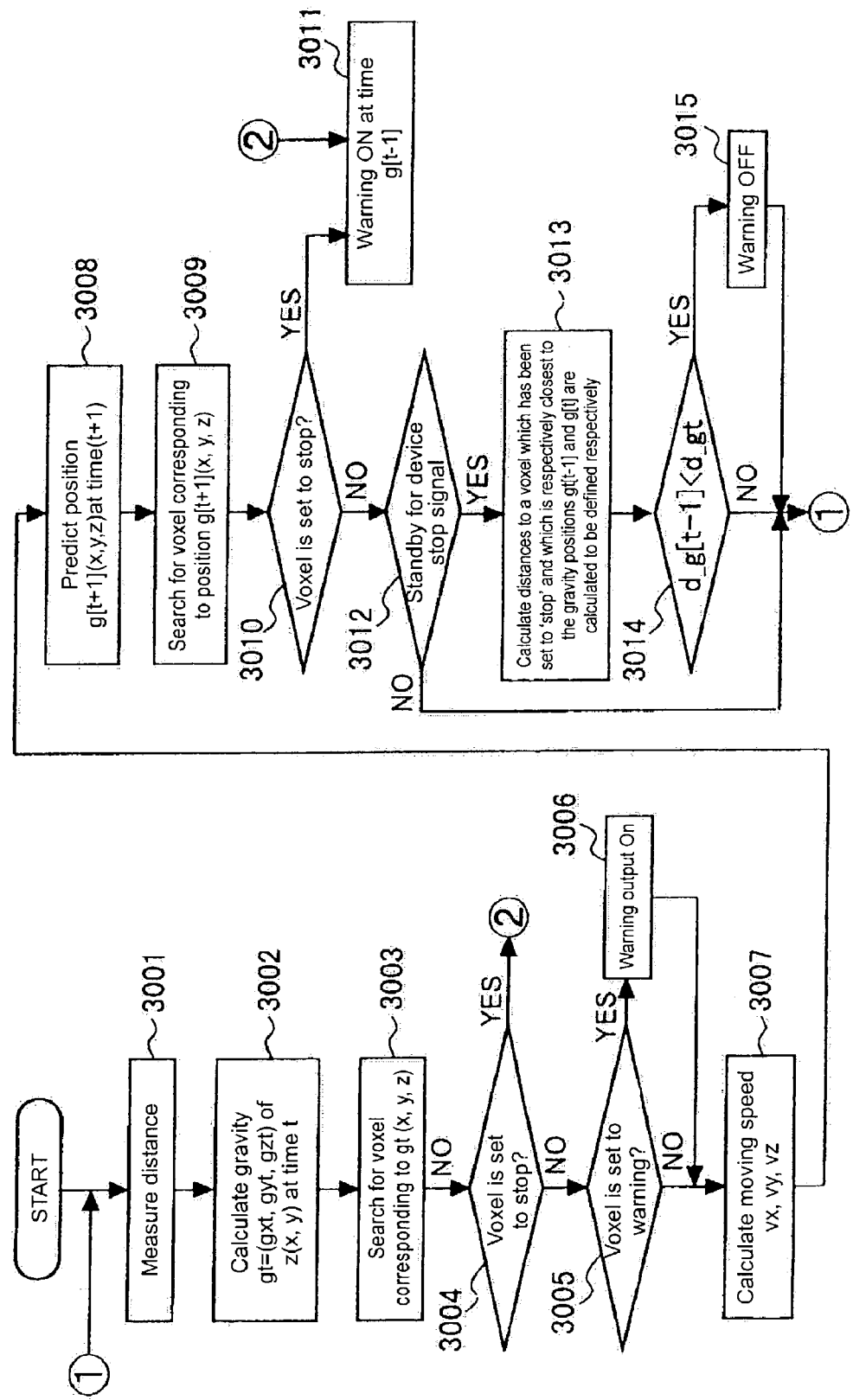
FIG. 30 is a flowchart of contents of processing of the arrival range prediction of the object.

A flowchart of contents of processing regarding to the foregoing calculation of the gravity coordinates and a prediction of arrival positions is presented in FIG. 30.

In a step 3001, distance measurement (calculation of coordinates z (x, y)) to the incoming object by the method for distance measurement shown in FIG. 25.

In a step 3002, coordinates of points satisfying an equation z (x,y)<L are added the calculated distance coordinates z (x, y) and the coordinates z (x, y) are divided by the total number of the points satisfying the equation, so that gravity coordinates gt (x, y, z) at the time (time t) are calculated.

In a step 3003 a voxel to which the gravity coordinates gt (x, y, z) belong (be positioned) is searched. (Octagon coordinates of a voxel are already known by calculation, so that the voxel to which the gravity coordinates gt (x, y, z) belong can be specified in comparison with the octagon coordinates.)

In a step 3004, if a voxel to which gravity coordinates g[t−1] belong have been set to 'warning' or 'no reaction' and also the appropriate voxel has been set to 'stop', it is decided that the incoming object has entered into a predetermined area (voxel), then, the signal to stop the equipment is outputted in a step 3011.

In a step 3005, if the voxel to which the coordinates g[t−1]belong have been set to 'no reaction' and also the appropriate voxel with the coordinates gt has been set to 'warning' in a step 3006.

In a step 3007, the moving speed V of gravity is calculates as following equations.

$vx=(gxt-gx\ [t-1])/dt$ $vy=(gyt-gy\ [t-1])/dt$ $vz=(gzt-gz\ [t-1])/dt$ [Equation 6]

In a step 3008, it is calculated that how far gravity moves by the next sampling time (t+1) according to the following equations.

$gx[t+1]=gxt+vx*dt$ $gy[t+1]=gyt+vy*dt$ $gz[t+1]=gzt+vz*dt$ [Equation 7]

In a step 3009, it is searched that in which voxel gravity coordinates g [t+1](x, y, z) will enter by the next sampling time (t+1). The search is performed in comparison with the octagon coordinates of the voxel.

In a step 3010, in a predictive position of the gravity at the time (t+1) is in a voxel that has been set to 'stop', it is decided that being in a dangerous situation, the signal to stop the equipment is outputted in a step 3011. In the present embodiment, once the signal is outputted, the equipment is stopped to operate until the equipment is reset (until a signal to restart an operation of the equipment is outputted) through a user's operation.

In a step 3012, it is decided whether the voxel to which the gravity coordinates g[t−1] belongs have been set to 'warning' or not. If the voxel has not been set to 'warning', processing will return to the step 3001.

In a step 3013, Distances to a voxel which has been set to 'stop' and which is respectively closest to the gravity positions gt[t−1] and g[t] are calculated to be defined respectively as d_g[t−1] and d_g[t].

In a step 3014, if it is recognized that a warning is now outputted from the decision part 35 and also that d_g[t−1] <d_g[t], it is decided that the incoming object is moving away from the voxel which has been set to 'stop' or that the object only has grazed the voxel which has been set to 'warning' so as to release the warning output.

Figure 31:
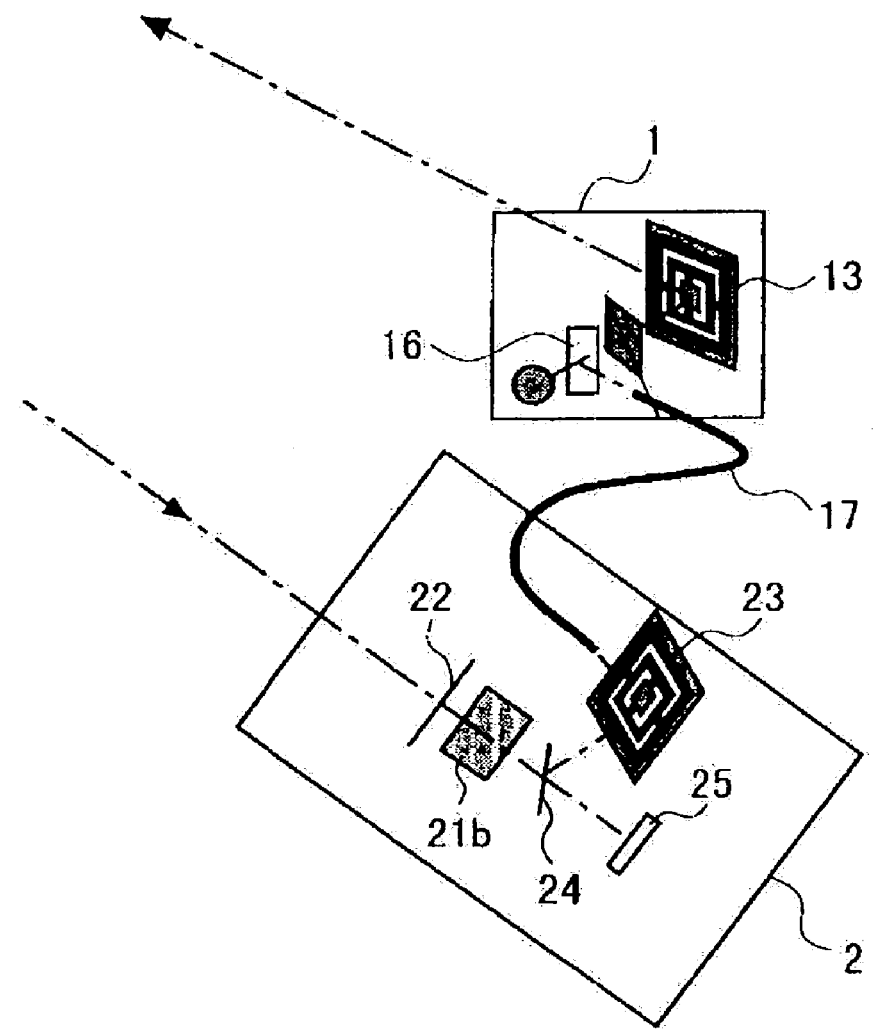
FIG. 31 is a block diagram of a configuration of an apparatus for the self-diagnosis processing in another embodiment.

Another method for self-diagnosis possible to be adapted to the three-dimensional monitoring apparatus of the present invention is described as follows. In the embodiment, if the swing angle of the MEMS 13 is 0° during the self-diagnosis, it is impossible for the self-diagnosis to check whether ON/OFF of the light source element 11 is performed normally or not. Thus, in another method, the light source unit 1 and the camera unit 2 are used in another embodiment shown in FIG. 31. Only points different from the previous embodiment are explained as follows.

A beam splitter 16 to irradiate a part of irradiating light from the light source element 11 to an optical fiber 17 is added to the light source unit 1. Other parts, except as described above, of the light source unit 1 are the same those of the previous embodiment.

A half miller 24 and an MEMS 23 to focus a laser beam that is a branch of the projecting light from the light source element 11 on a CCD 25, are added to the camera unit 2. The branched laser beam is controlled to be focused at the both of the top end and the bottom end on the CCD 25 and not to be an obstacle of imaging of the pattern light irradiated from the light source unit 1.

The camera unit control part 32 controls the MEMS 23 to scan the branched laser beam from the right end to the left end on the CCD during opening of the shutter.

Fields are split to even fields and odd fields, so that the camera unit 2 forms an image on the top end over the CCD 25 when imaging the even fields, and forms the image on the bottom end on the CCD 25 when imaging the odd fields.

A timing chart of relations of control signals between the MEMS 1 and the MEMS 2 is presented in FIG. 32. FIG. 32A shows a control signal associated with swing angles θwx and θwy in the directions of the X-axis and the Y-axis of the MEMS 13, FIG. 32B shows a control signal associated with an oscillation control signal (ON/OFF control) of the light source element 11, FIG. 32C shows a control signal associated with a swing angle θvx in the direction of the X-axis of the MEMS 23 and FIG. 32D shows a control signal associated with a swing angle θvy in the direction of the Y-axis of the MEMS 23.

As shown in FIG. 32, during scanning of the MEMS 13 to the pattern light of one cycle of a character 8 in the monitoring space S, the MEMS 23 scans the branched laser beam over the CCD.

The self-diagnosis part performs the self-diagnosis with the following steps.

Figure 33B:
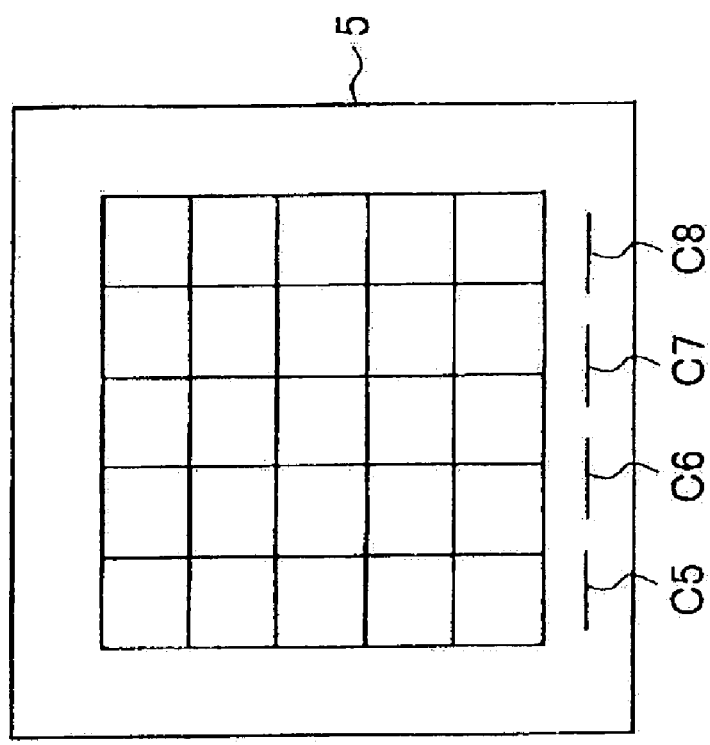
FIGS. 33A and 33B is an illustration of an example of captured image associated with the self-diagnosis processing in another embodiment.
Figure 33A:
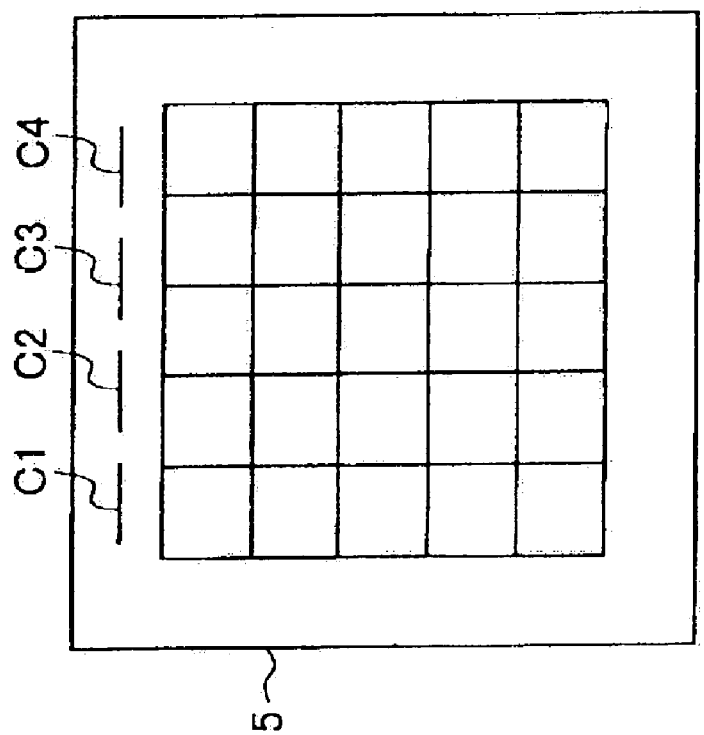

1) In the even fields, confirms that lines C1-C4 corresponding to the ON/OFF control of the light source element 11 at the top end of an image shown in FIG. 33A.

2) In the odd fields, confirms that lines C5-C8 corresponding to the ON/OFF control of the light source element 11 at the bottom end of the image.

3) If the lines C1-C8 are confirmed in the steps 1) and 2), it is considered that the self-diagnosis is completed without problems.

In the method for self-diagnosis described above, even though the swing angle of the MEMS 13 is 0°, the self-diagnosis can be performed accurately.

Although the screen 5 is used as a projection plane for the pattern projection in the foregoing embodiment, a wall and the like placed behind the monitoring space S are useful.

As described above, according to the present invention, a three-dimensional monitoring apparatus capable of detecting an incoming of an object into a predetermined three-dimensional space to be monitored can be provided with high accuracy.

What is claimed is:

1. A three-dimensional monitoring apparatus, comprising:
an irradiating means for irradiating predetermined pattern light to a three-dimensional space to be monitored;
an imaging means for imaging a projection pattern projected by irradiating the pattern light on a surface of an incoming object existing in the space to be monitored and on a surface of a predetermined body composing of a background of the space to be monitored to capture image data;
a position measuring means for acquiring position information on the incoming object into the three-dimensional space to be monitored based on the comparison between the image data captured via the imaging means when there is the incoming object in the space to be monitored and reference image data corresponding to the image data captured via the imaging means when there is no incoming object in the space to be monitored;
a decision-output means for outputting a device control signal based on the position information calculated by the position measuring means; and
a self-diagnosis means for confirming appropriately whether the projection pattern based on the pattern light irradiated via the irradiating means is matched with a predictive projection pattern and for ensuring normal operations of each configuration means when the matching is confirmed, and when the matching is not confirmed, (1) providing "OK" as a diagnosis result if a difference between the projection pattern and the predictive projection pattern is within an allowable range, and (2) providing "NG" as a diagnosis result if the difference between the projection pattern and the predictive projection pattern is not within the allowable range.

2. A three-dimensional monitoring apparatus as claimed in claim 1,
wherein the irradiating means has a scanning mechanism capable of scanning the pattern light within a predetermined area by controlling the direction of irradiating of the pattern light; and wherein the imaging means captures image data corresponding to a combined projection of a plurality of instant projection patterns irradiated to the space to be monitored at a predetermined direction and timing through a scanning of the pattern light in the space to be monitored by the scanning mechanism.

3. A three-dimensional monitoring apparatus as claimed in claim 1, wherein the three-dimensional monitoring apparatus has a self-diagnosis means for detecting automatically the presence or absence of unusual occurrences of operations of the monitoring apparatus itself based on whether a predictive checked pattern is appeared normally in the image data captured by irradiating directly a part of the light irradiated from the irradiating means on an imaging plane of the imaging means.

4. A three-dimensional monitoring apparatus as claimed in claim 3, wherein the three-dimensional monitoring apparatus has a laser beam source as the irradiating means and defines the checked pattern by flashing timing and scanning timing of the laser beam source.

5. A three-dimensional monitoring apparatus as claimed in claim 1, wherein the self-diagnosis means is further configured to output a device control stop signal when it provides "NG" as the diagnosis result.

6. A three-dimensional monitoring system including a three-dimensional monitoring apparatus and equipment to be controlled, wherein the monitoring apparatus comprises:

an irradiating means for irradiating a predetermined pattern light to a three-dimensional space to be monitored;

an imaging means for imaging a projection pattern projected by irradiating the pattern light on a surface of an incoming object existing in the space to be monitored and on a surface of a predetermined body composing of a background of the space to be monitored to capture image data;

a position measuring means for calculating position information on the incoming object into the three-dimensional space to be monitored based on the comparison between the image data captured via the imaging means when there is the incoming object in the space to be monitored and reference image data corresponding to the image data captured via the imaging means when there is no incoming object in the space to be monitored;

an output means for outputting a control signal to the equipment based on the calculated position; and a self-diagnosis means for confirming appropriately whether the projection pattern based on the pattern light irradiated via the irradiating means is matched with a predictive projection pattern and for ensuring normal operations of each configuration means when the matching is confirmed, and when the matching is not confirmed, (1) providing "OK" as a diagnosis result if a difference between the projection pattern and the predictive projection pattern is within an allowable range, and (2) providing "NG" as a diagnosis result if the difference between the projection pattern and the predictive projection pattern is not within the allowable range.

* * * * *